(12) United States Patent  
Nishimura

(10) Patent No.: US 6,384,986 B1  
(45) Date of Patent: May 7, 2002

(54) ZOOM LENS AND OPTICAL APPARATUS HAVING THE SAME

(75) Inventor: Takeshi Nishimura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/489,938

(22) Filed: Jan. 24, 2000

(30) Foreign Application Priority Data

Feb. 2, 1999 (JP) .......................... 11-025180
May 24, 1999 (JP) .......................... 11-143052

(51) Int. Cl.$^7$ ............................................. G02B 15/14
(52) U.S. Cl. ........................................ 359/692; 359/691
(58) Field of Search .............................. 359/692, 691, 359/690, 689

(56) References Cited

U.S. PATENT DOCUMENTS

| | | | | |
|---|---|---|---|---|
| 4,659,186 A | | 4/1987 | Sato et al. ................. | 350/423 |
| 4,682,860 A | | 7/1987 | Tanaka et al. ............. | 350/423 |
| 5,757,556 A | | 5/1998 | Nishimura ................. | 359/692 |
| 5,798,873 A | | 8/1998 | Hoshi et al. ............... | 359/692 |
| RE36,326 E | * | 10/1999 | Ito et al. ................... | 359/692 |
| 5,995,298 A | * | 11/1999 | Ohno ....................... | 359/692 |
| 5,999,331 A | * | 12/1999 | Yamamoto ................. | 359/692 |
| 6,052,541 A | * | 4/2000 | Nishimura ................. | 396/382 |

FOREIGN PATENT DOCUMENTS

| | | |
|---|---|---|
| JP | 56-128911 | 10/1981 |
| JP | 57-201213 | 12/1982 |
| JP | 60-170816 | 9/1985 |
| JP | 60-191216 | 9/1985 |
| JP | 62-56917 | 3/1987 |
| JP | 62-90611 | 4/1987 |
| JP | 62-113120 | 5/1987 |
| JP | 63-311224 | 12/1988 |
| JP | 3-116110 | 5/1991 |
| JP | 4-161914 | 6/1992 |
| JP | 9-211325 | 8/1997 |
| JP | 10-48523 | 2/1998 |

* cited by examiner

Primary Examiner—Georgia Epps  
Assistant Examiner—Tim Thompson  
(74) Attorney, Agent, or Firm—Fitzpatrick, Cella, Harper & Scinto

(57) ABSTRACT

A zoom lens includes, in order from an object side to an image side, a first lens unit of positive refractive power, the first lens unit including, in order from the object side to the image side, a first lens of positive refractive power having a convex surface facing the object side, a second lens of negative refractive power, a third lens of positive refractive power of meniscus form having a convex surface facing the image side and having an aspheric surface, and a fourth lens of positive refractive power, and a second lens unit of negative refractive power, wherein a variation of magnification is effected by varying an interval between the first lens unit and the second lens unit, and the following conditions are satisfied:

$$0.40 < f1/fw < 0.80$$

$$0.40 < |f2|/fw < 0.90$$

where fw is a focal length of the zoom lens in a wide-angle end, f1 is a focal length of the first lens unit, and f2 is a focal length of the second lens unit.

19 Claims, 18 Drawing Sheets

FIG. 1
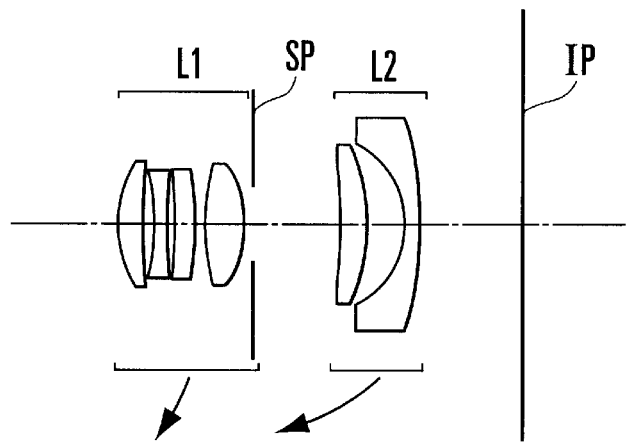
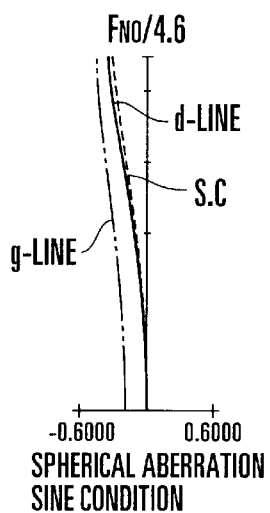
FIG. 2A1
Fno/4.6
d-LINE
S.C
g-LINE
-0.6000  0.6000
SPHERICAL ABERRATION
SINE CONDITION
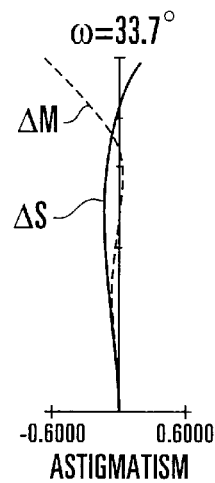
FIG. 2A2
ω=33.7°
ΔM
ΔS
-0.6000  0.6000
ASTIGMATISM
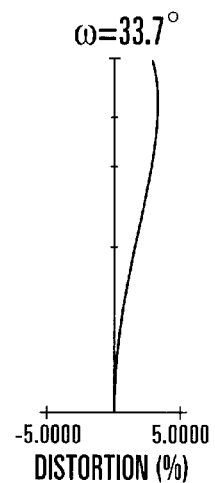
FIG. 2A3
ω=33.7°
-5.0000  5.0000
DISTORTION (%)
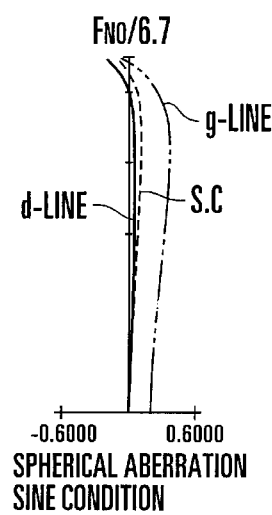
FIG. 2B1
Fno/6.7
g-LINE
d-LINE   S.C
-0.6000  0.6000
SPHERICAL ABERRATION
SINE CONDITION
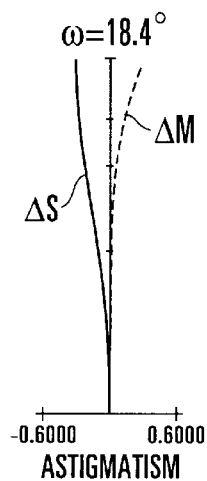
FIG. 2B2
ω=18.4°
ΔM
ΔS
-0.6000  0.6000
ASTIGMATISM
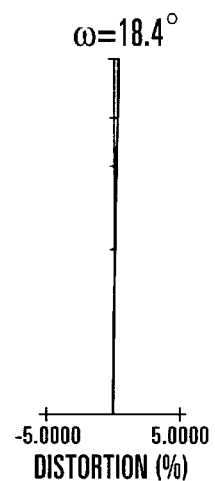
FIG. 2B3
ω=18.4°
-5.0000  5.0000
DISTORTION (%)

FIG. 3
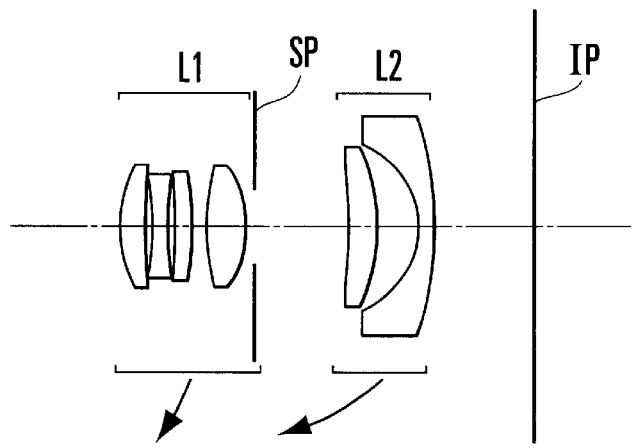
FIG. 4A1
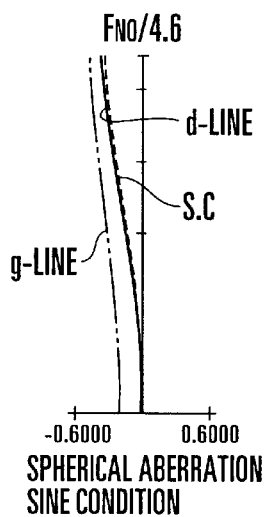
SPHERICAL ABERRATION
SINE CONDITION
FIG. 4A2
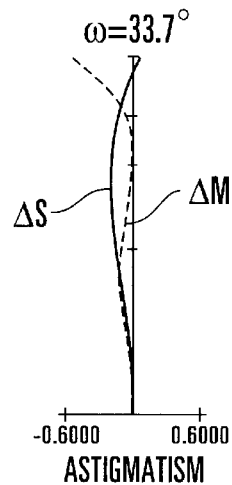
ASTIGMATISM
FIG. 4A3
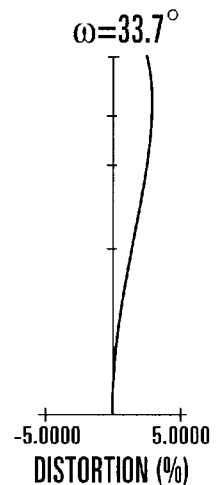
DISTORTION (%)
FIG. 4B1
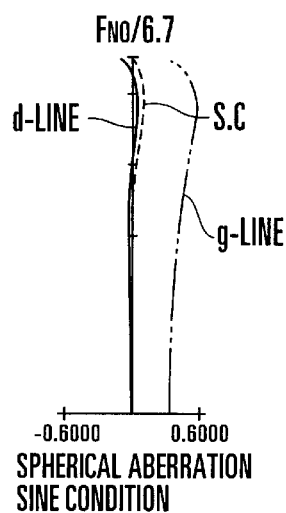
SPHERICAL ABERRATION
SINE CONDITION
FIG. 4B2
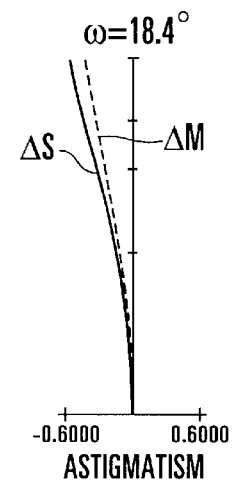
ASTIGMATISM
FIG. 4B3
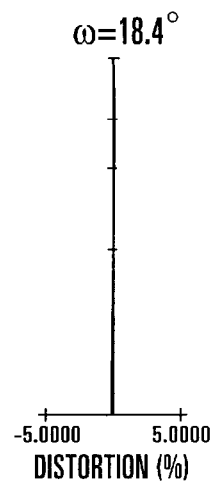
DISTORTION (%)

FIG. 5
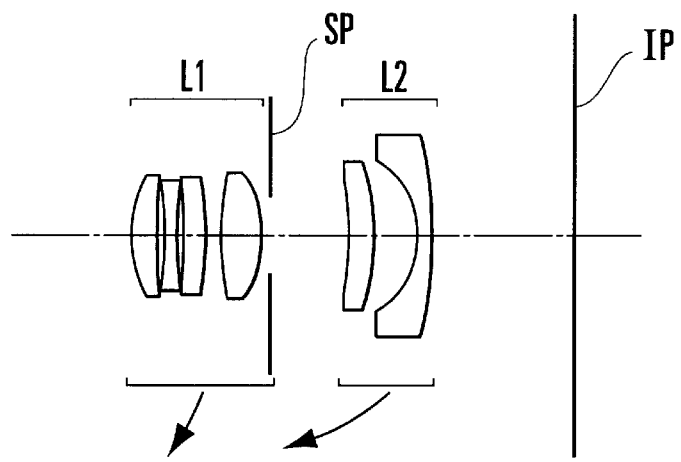
FIG. 6A1
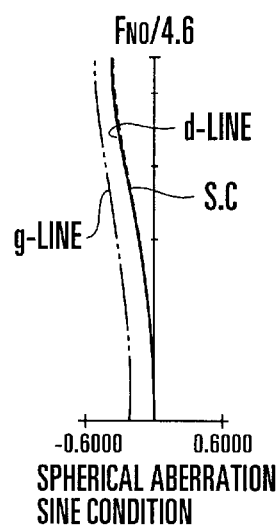
F$_{NO}$/4.6
SPHERICAL ABERRATION
SINE CONDITION
FIG. 6A2
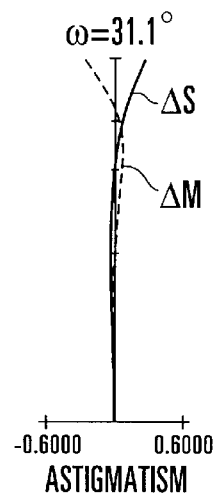
ω=31.1°
ASTIGMATISM
FIG. 6A3
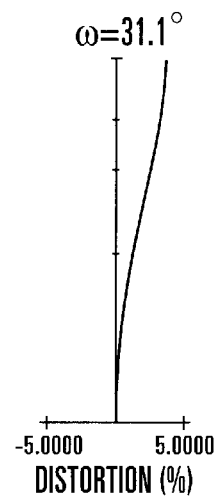
ω=31.1°
DISTORTION (%)
FIG. 6B1
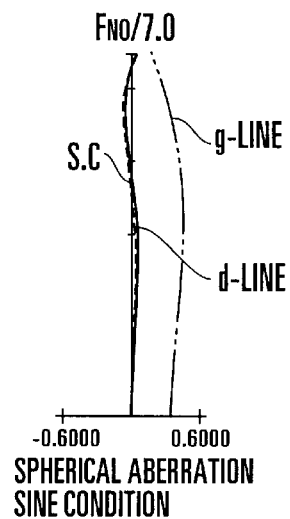
F$_{NO}$/7.0
SPHERICAL ABERRATION
SINE CONDITION
FIG. 6B2
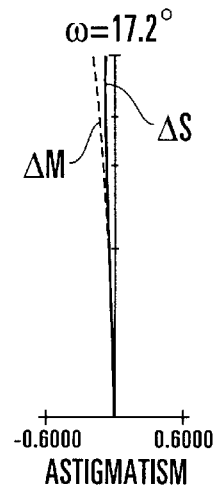
ω=17.2°
ASTIGMATISM
FIG. 6B3
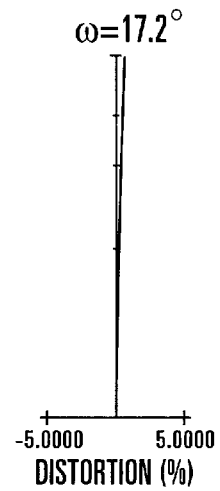
ω=17.2°
DISTORTION (%)

FIG. 7
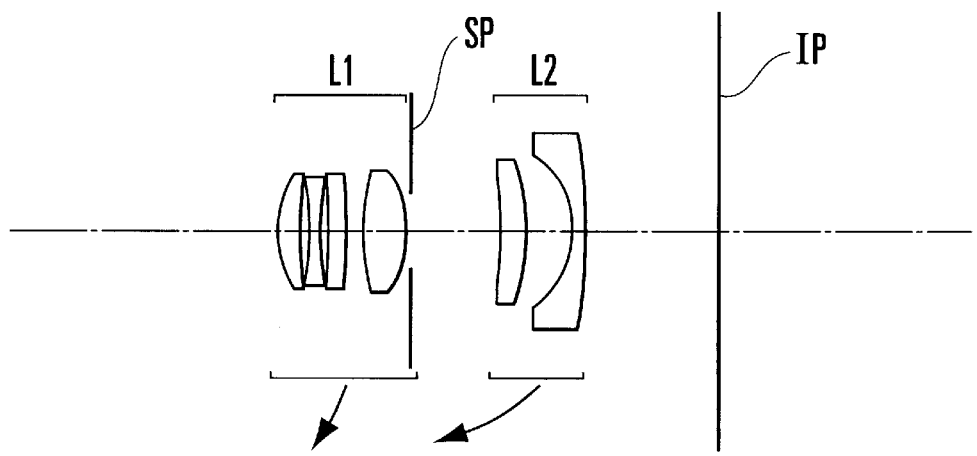
FIG. 8A1
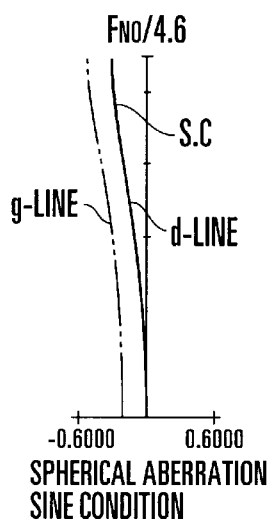
SPHERICAL ABERRATION
SINE CONDITION
FIG. 8A2
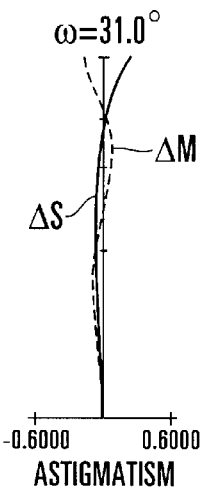
ASTIGMATISM
FIG. 8A3
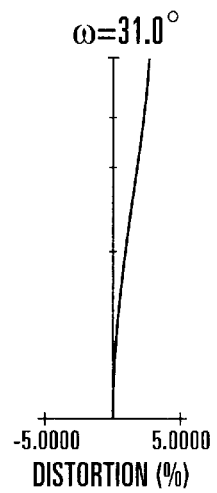
DISTORTION (%)
FIG. 8B1
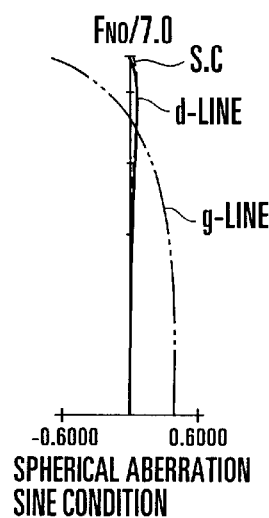
SPHERICAL ABERRATION
SINE CONDITION
FIG. 8B2
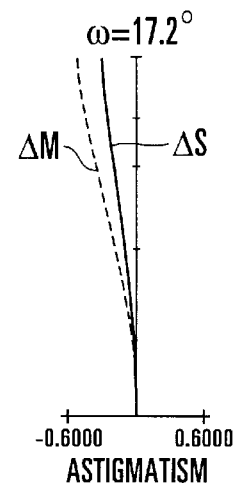
ASTIGMATISM
FIG. 8B3
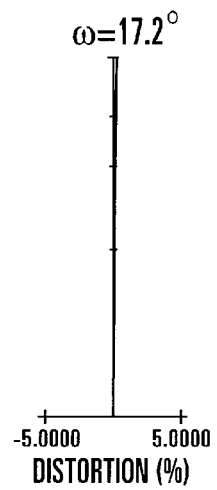
DISTORTION (%)

FIG. 9
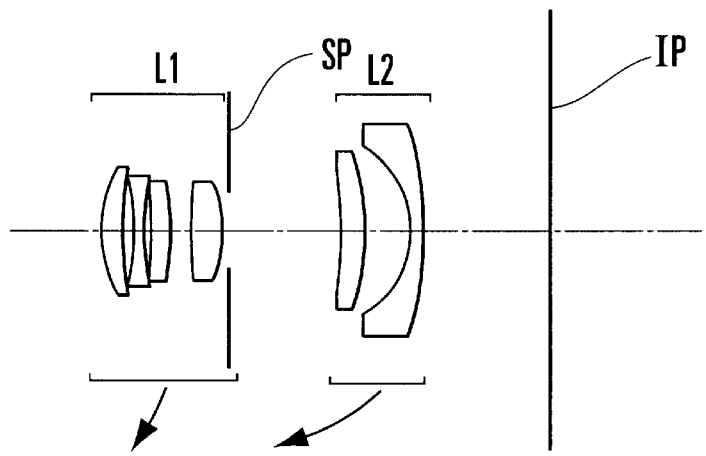
FIG. 10A1
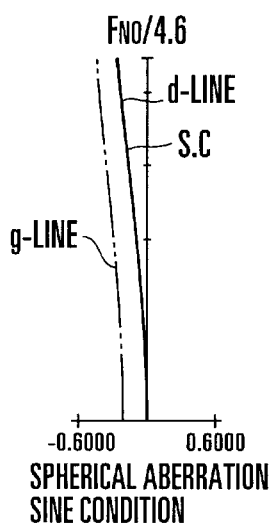
SPHERICAL ABERRATION
SINE CONDITION
FIG. 10A2
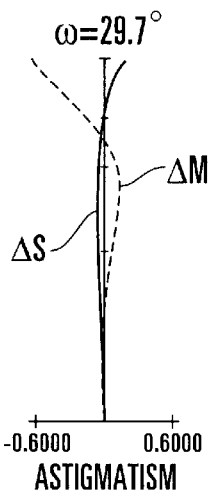
ASTIGMATISM
FIG. 10A3
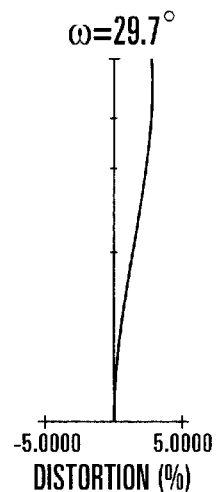
DISTORTION (%)
FIG. 10B1
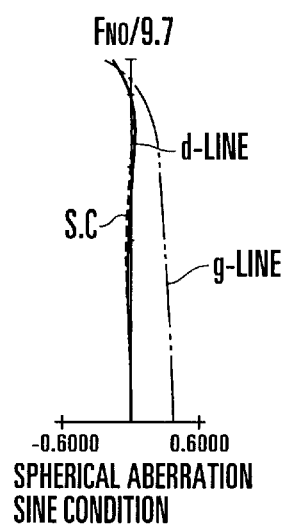
SPHERICAL ABERRATION
SINE CONDITION
FIG. 10B2
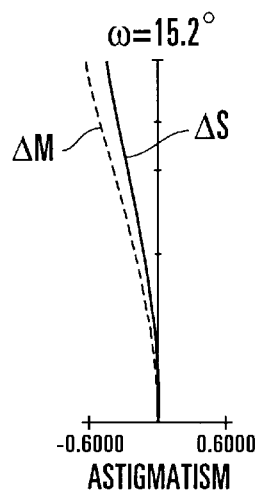
ASTIGMATISM
FIG. 10B3
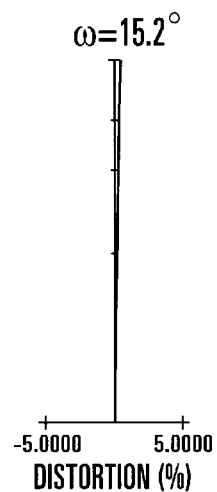
DISTORTION (%)

FIG. 11
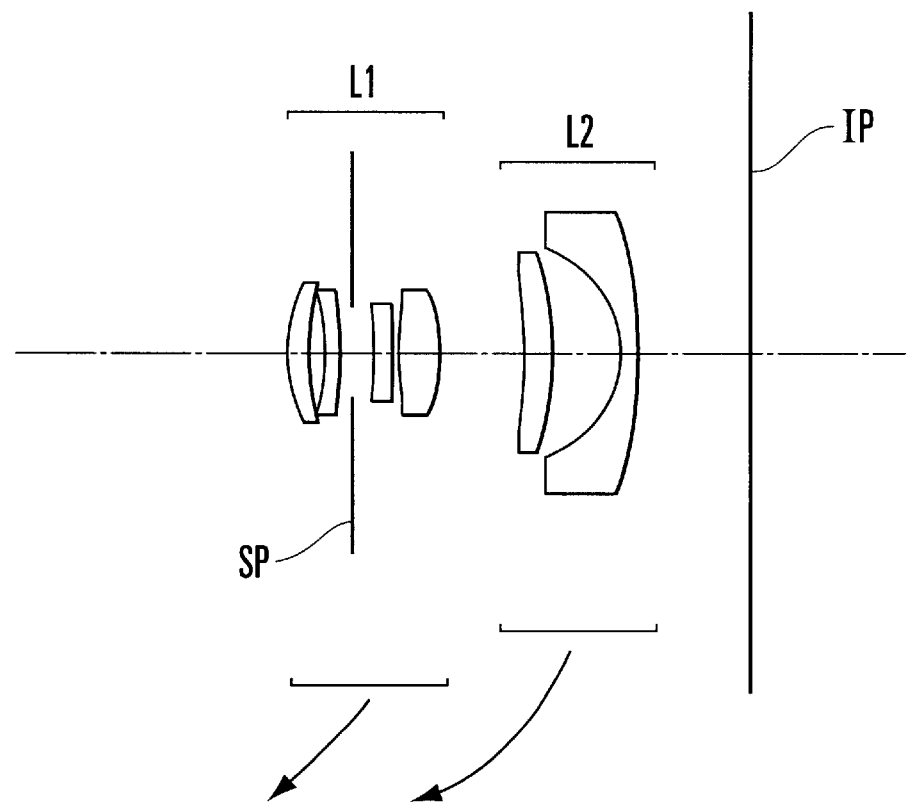
FIG.12A1  FIG.12A2  FIG.12A3  FIG.12A4
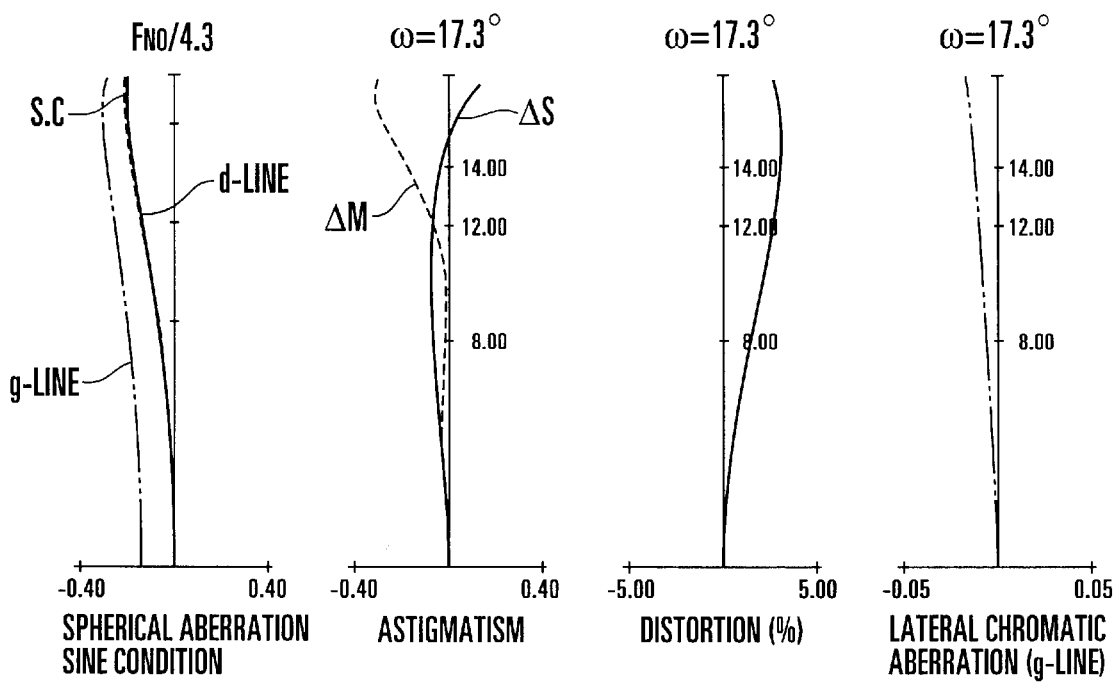

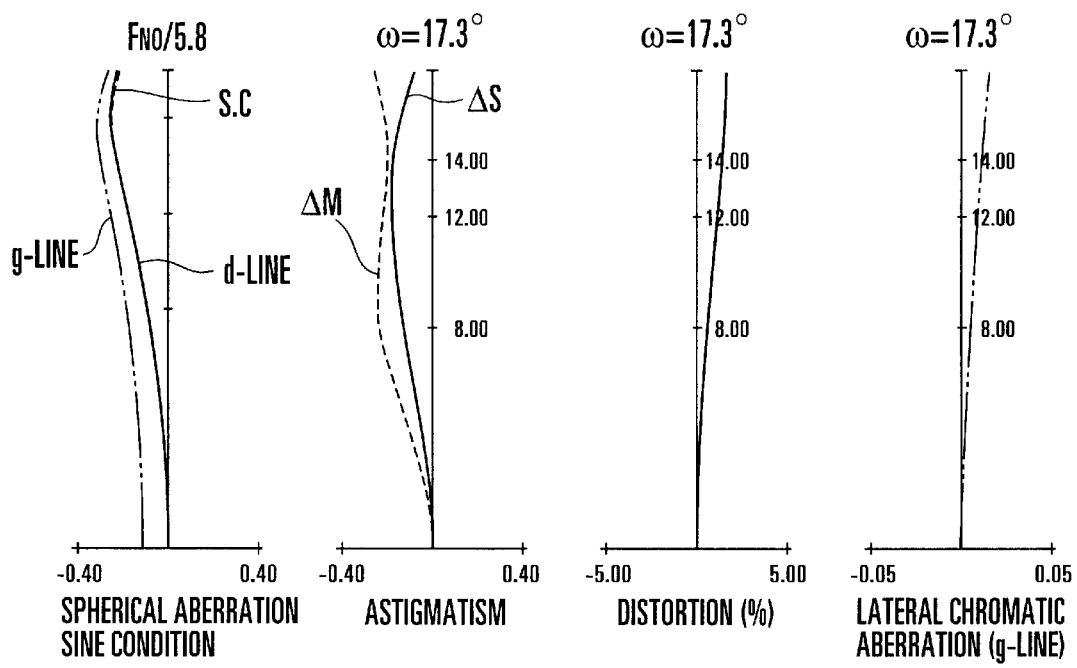
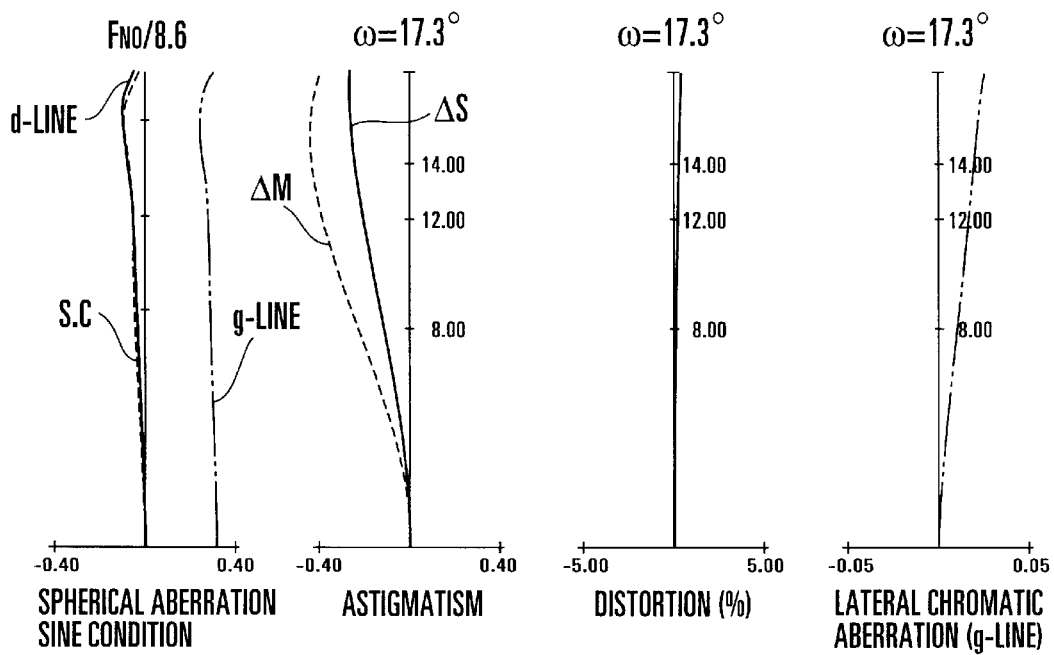

FIG.13
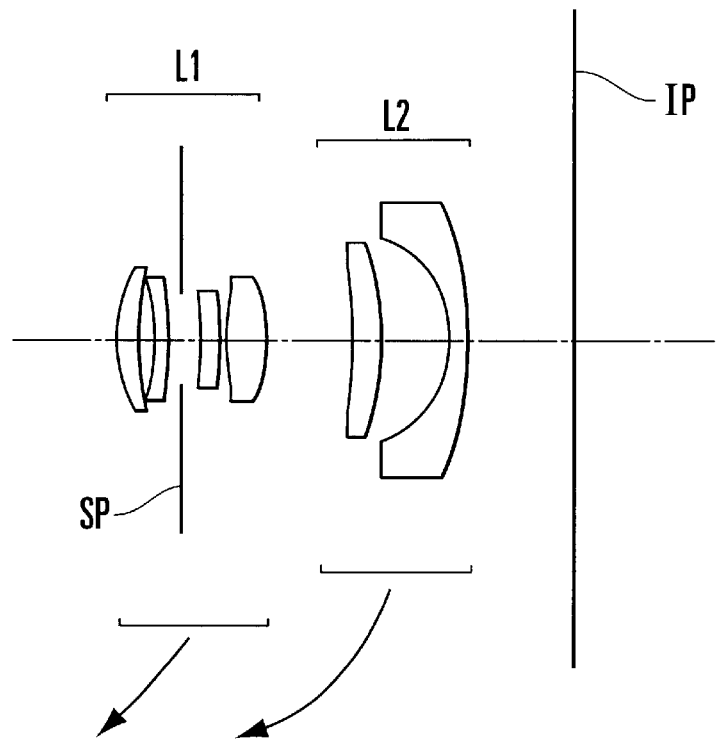
FIG.14A1  FIG.14A2  FIG.14A3  FIG.14A4
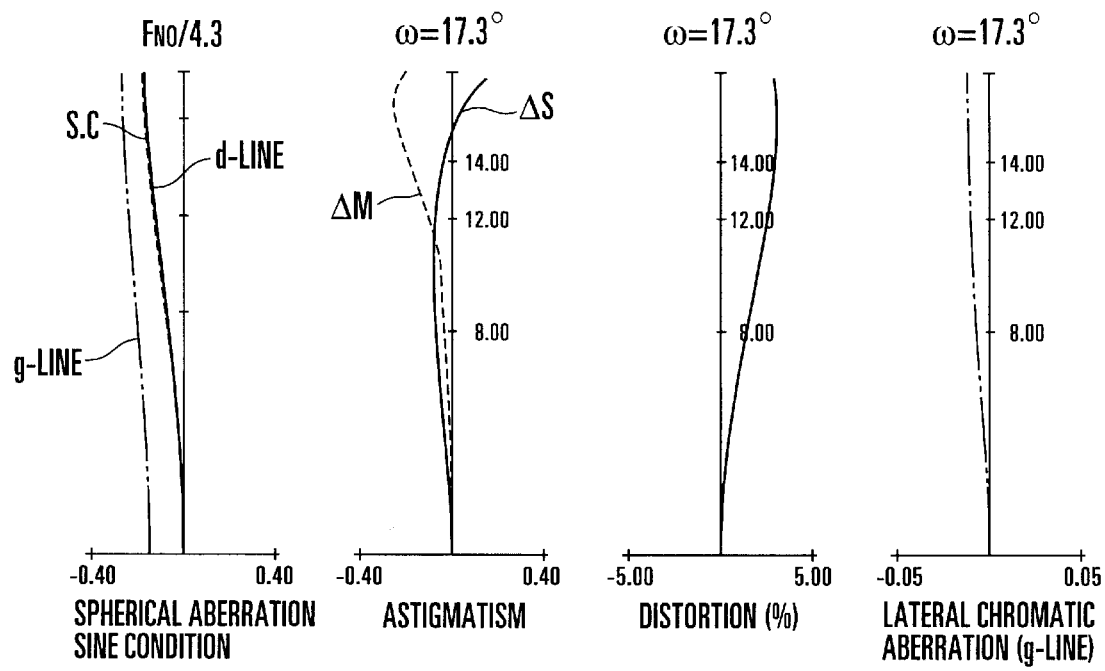

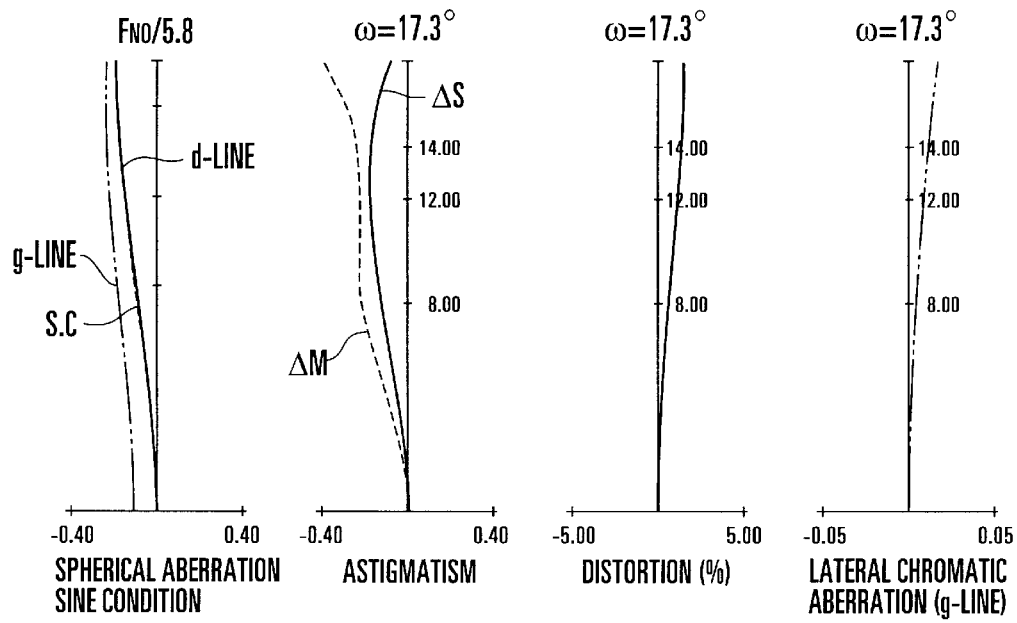
FIG.14B1 FIG.14B2 FIG.14B3 FIG.14B4
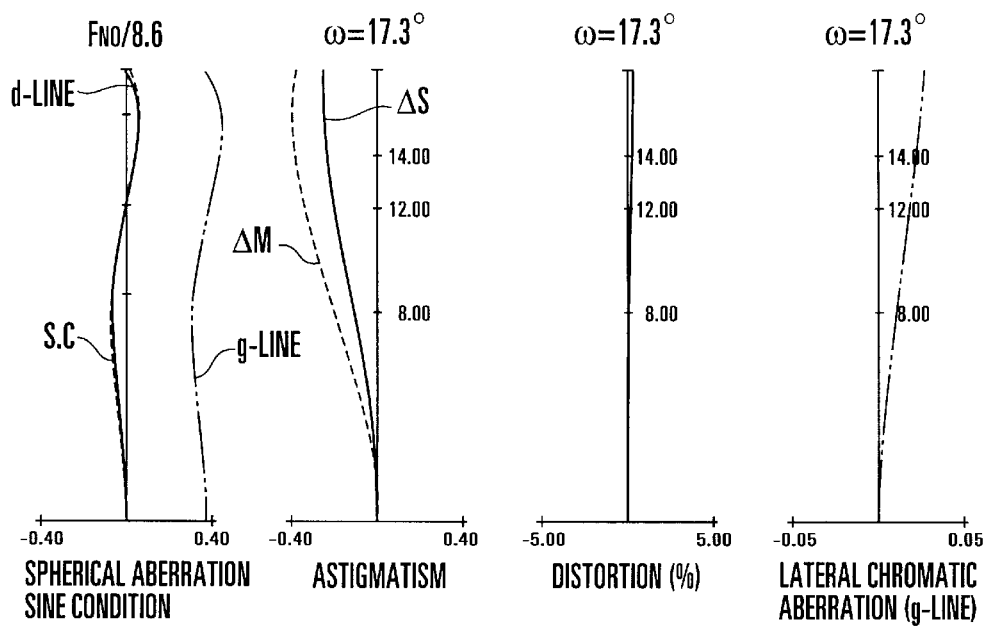
FIG.14C1 FIG.14C2 FIG.14C3 FIG.14C4

FIG.15
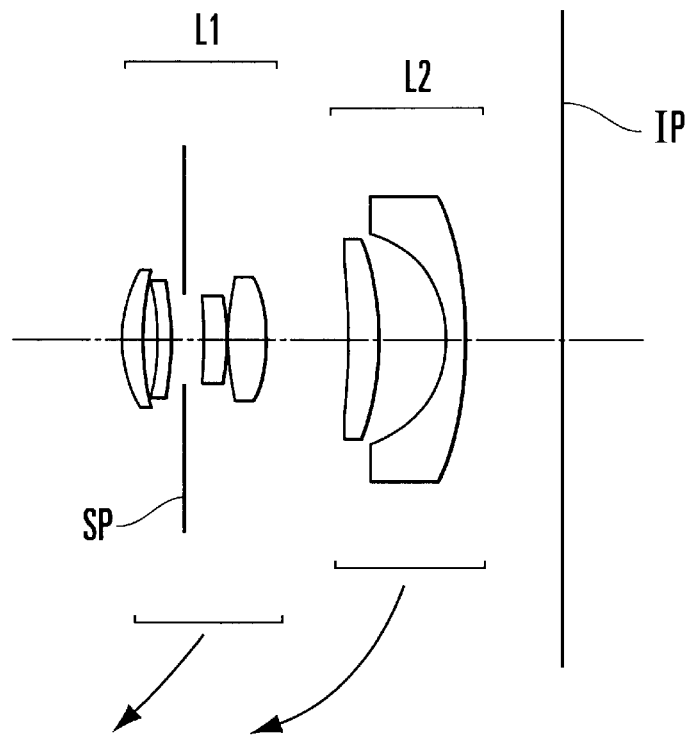
FIG.16A1  FIG.16A2  FIG.16A3  FIG.16A4
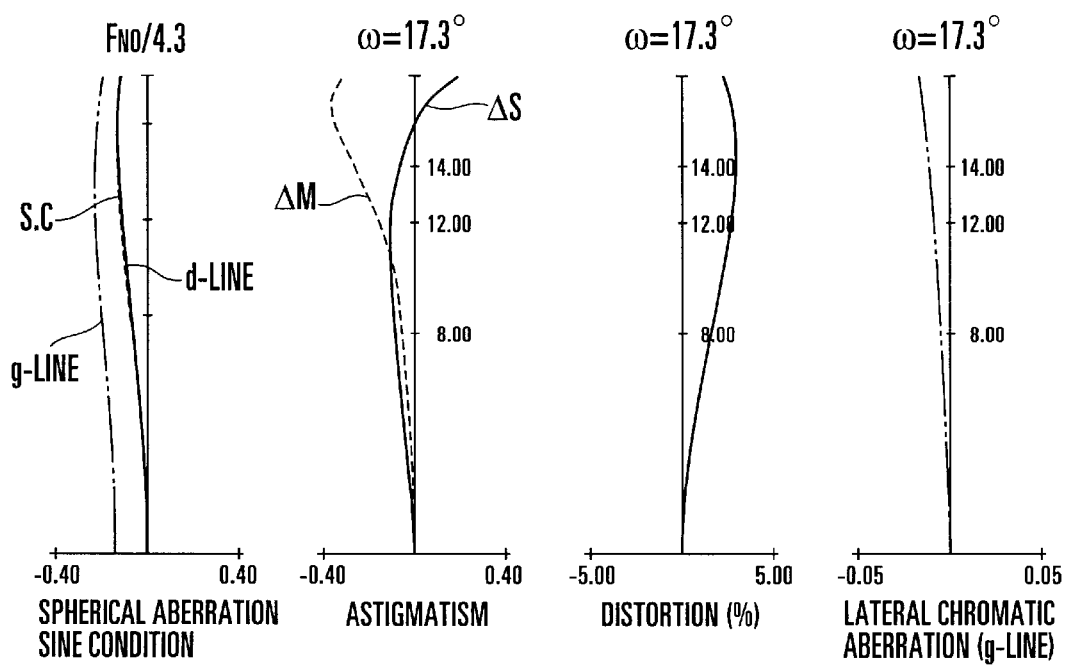

FIG.16B1 FIG.16B2 FIG.16B3 FIG.16B4
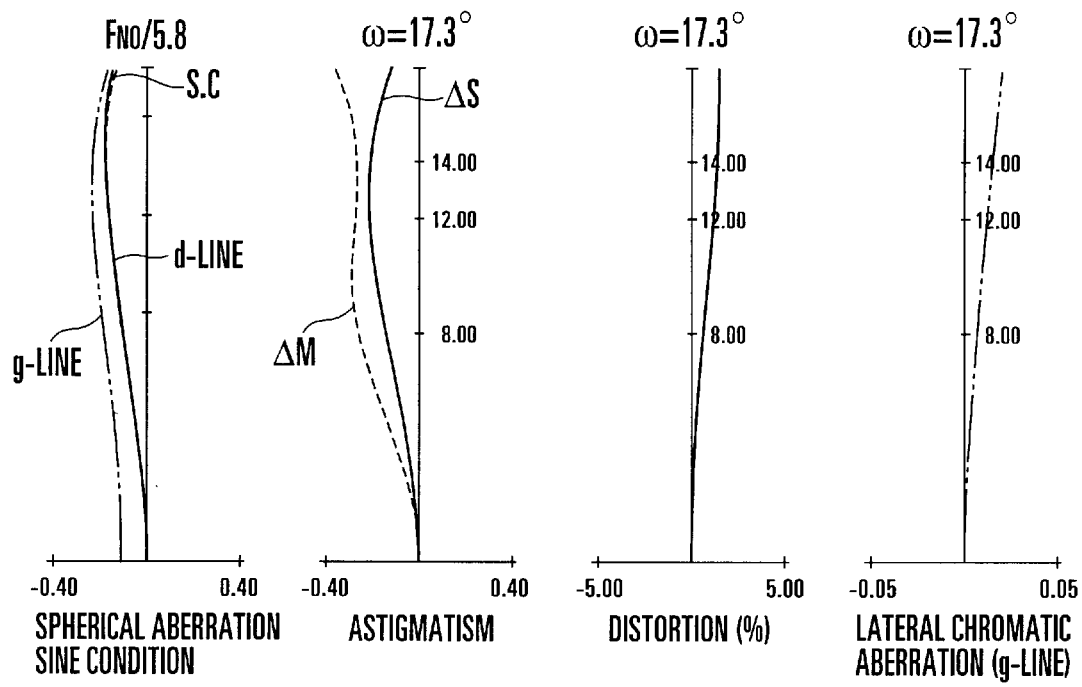
FIG.16C1 FIG.16C2 FIG.16C3 FIG.16C4
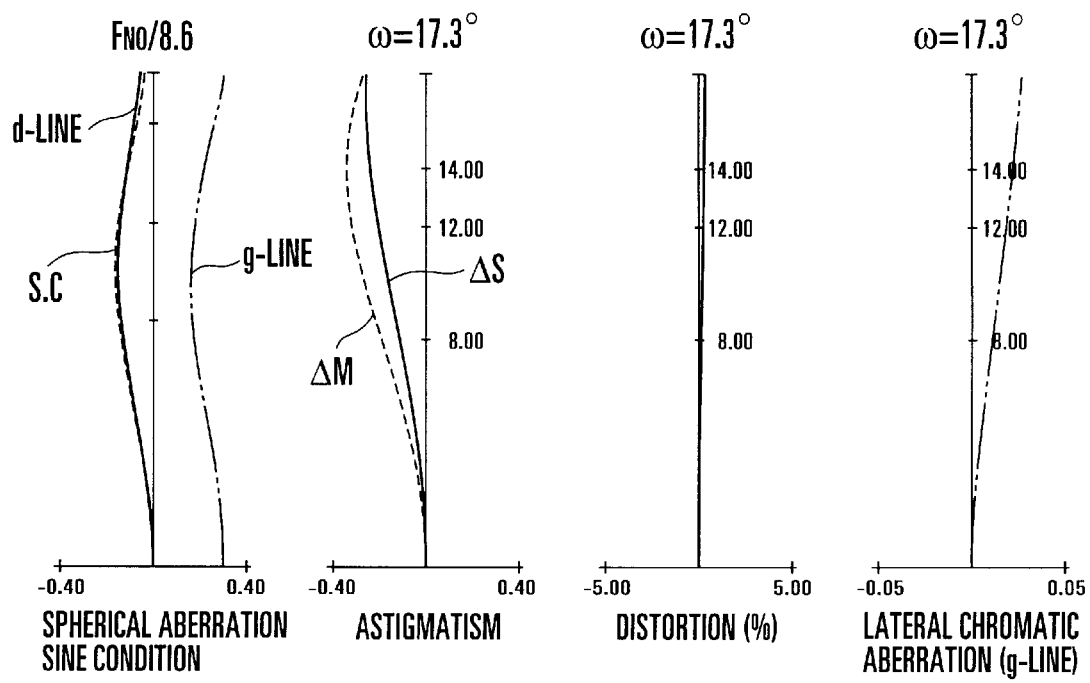

FIG.17
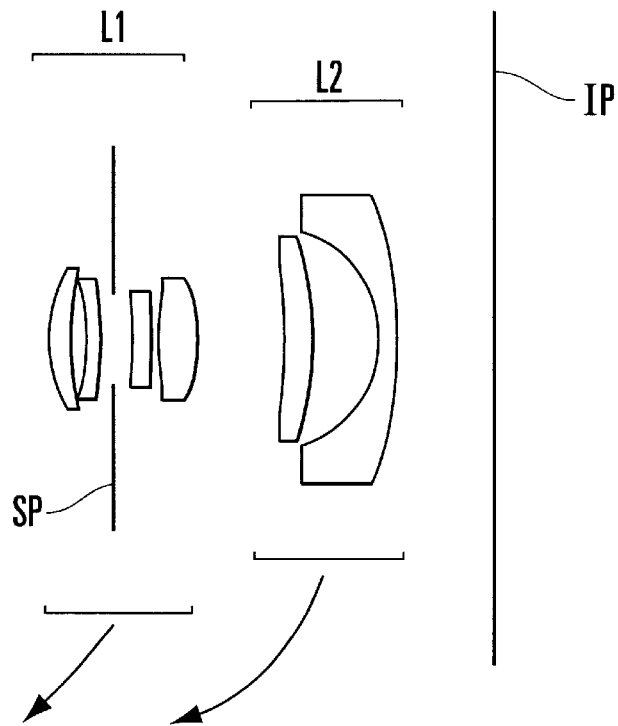
FIG.18A1 FIG.18A2 FIG.18A3 FIG.18A4
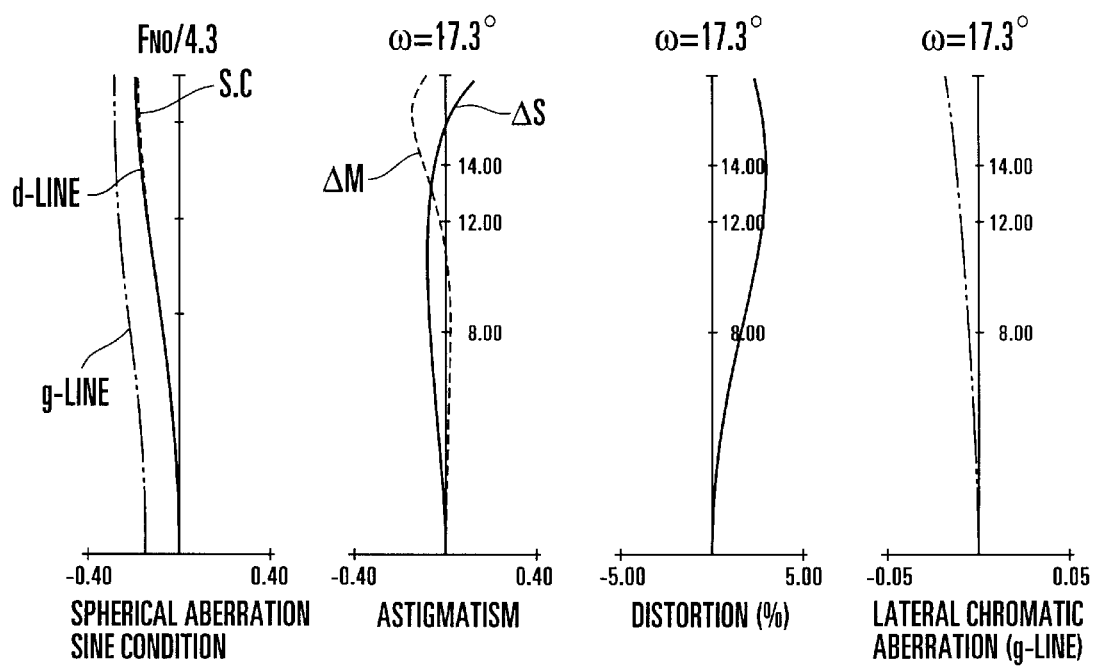

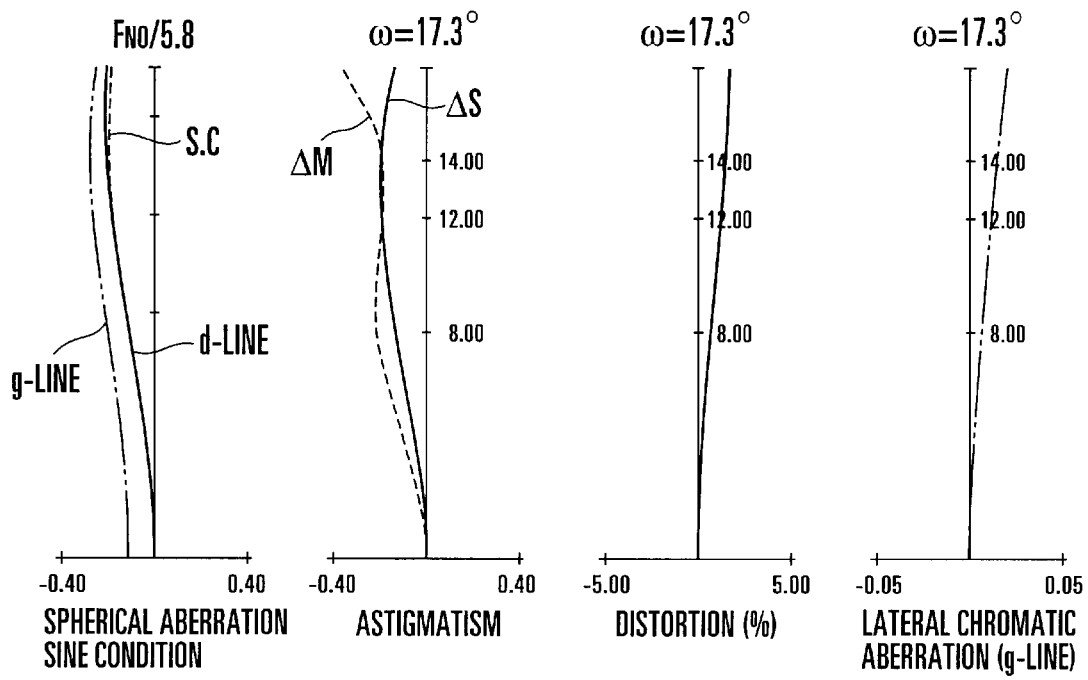
FIG.18B1 FIG.18B2 FIG.18B3 FIG.18B4
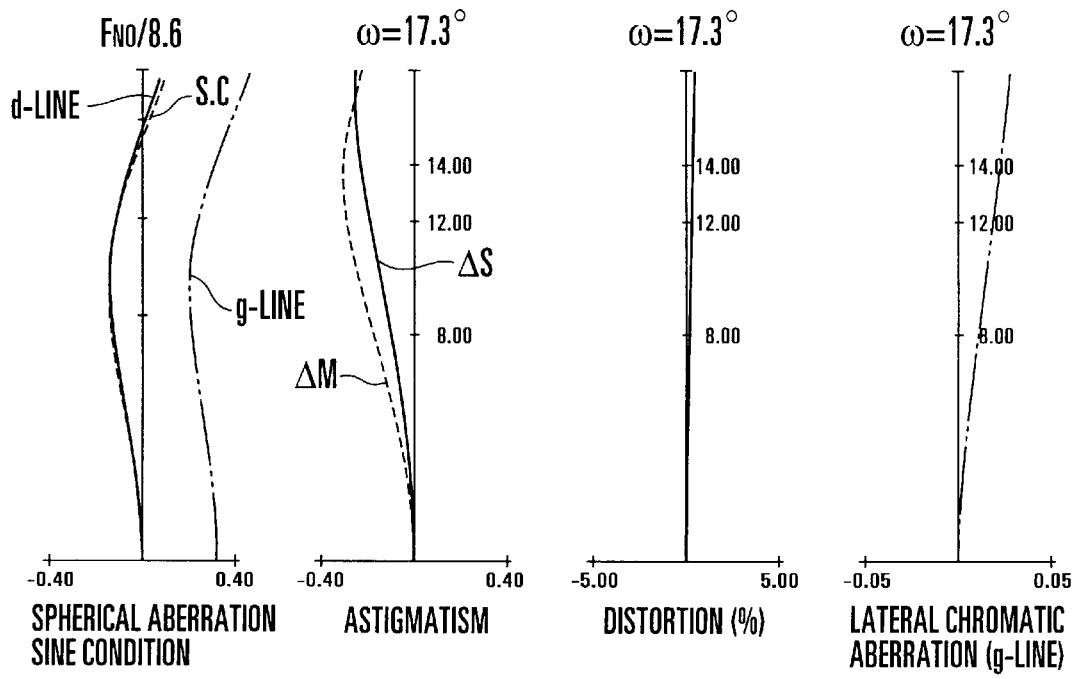
FIG.18C1 FIG.18C2 FIG.18C3 FIG.18C4

FIG. 19
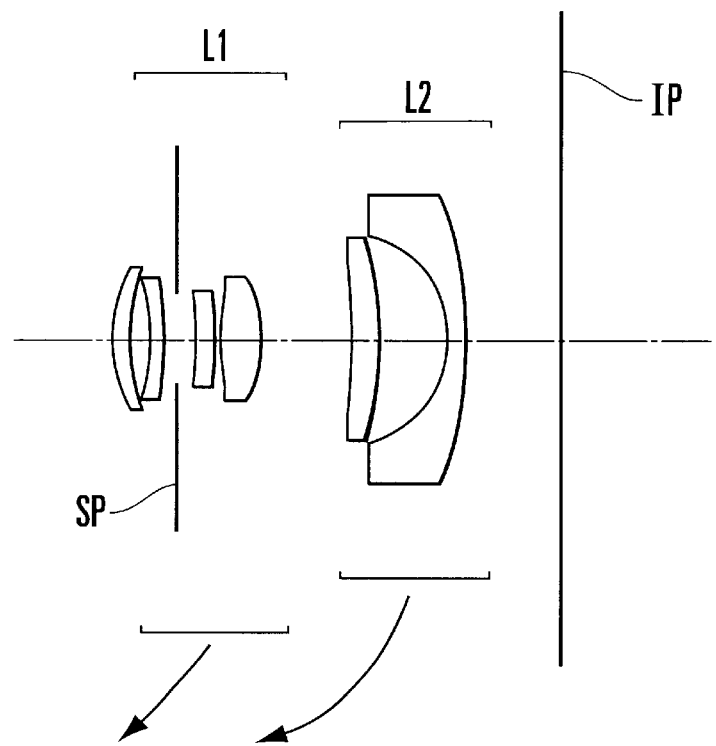
FIG.20A1  FIG.20A2  FIG.20A3  FIG.20A4
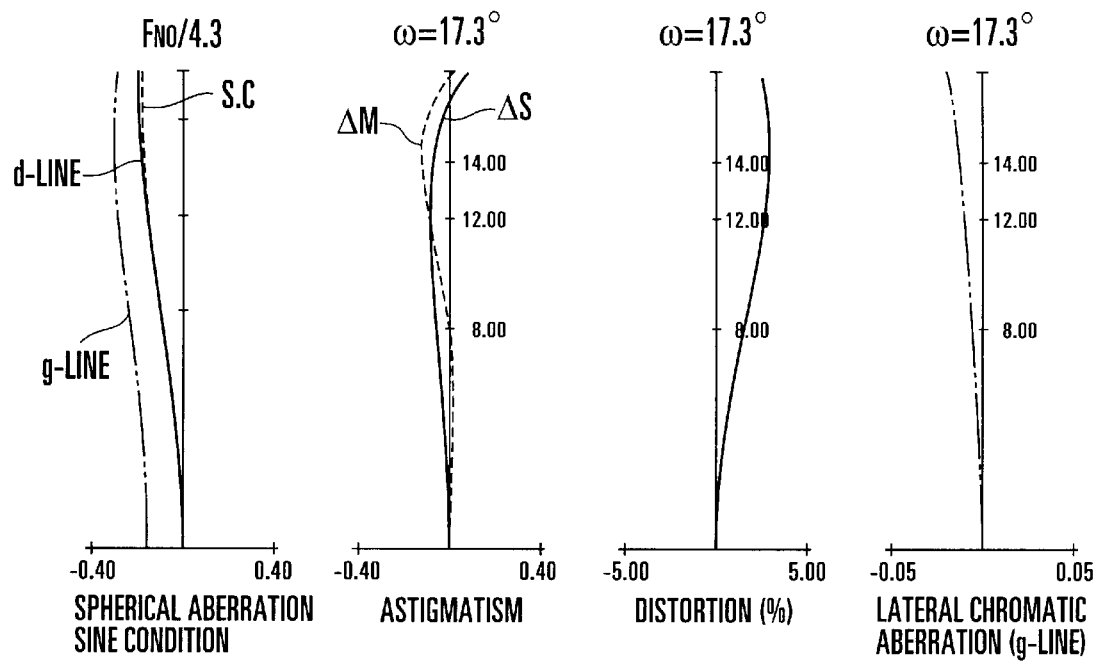

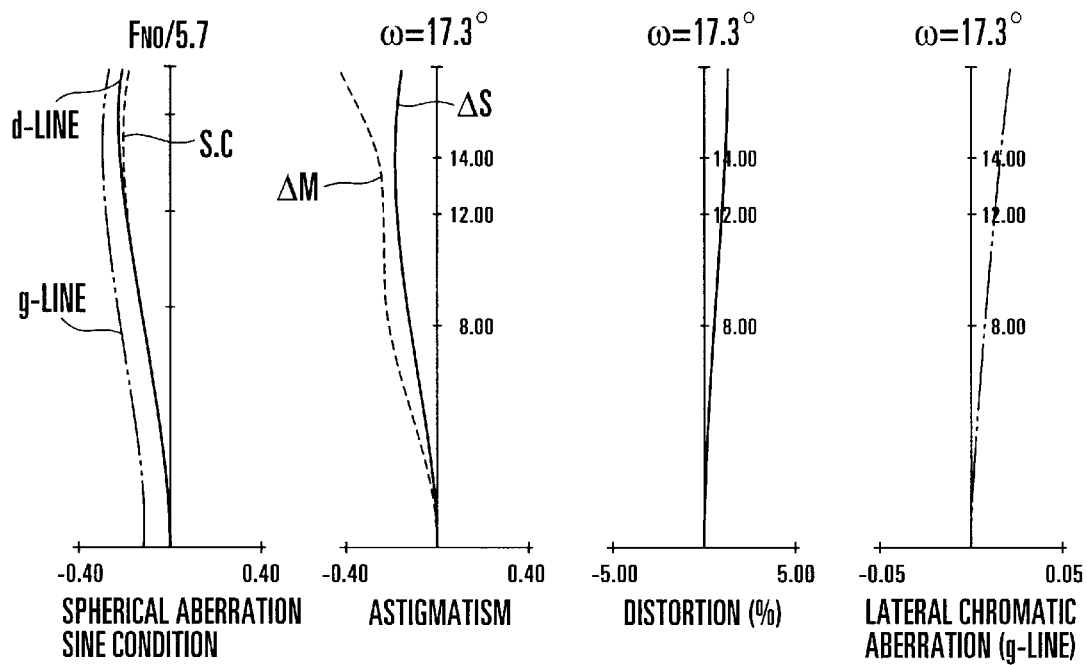
FIG.20B1 FIG.20B2 FIG.20B3 FIG.20B4
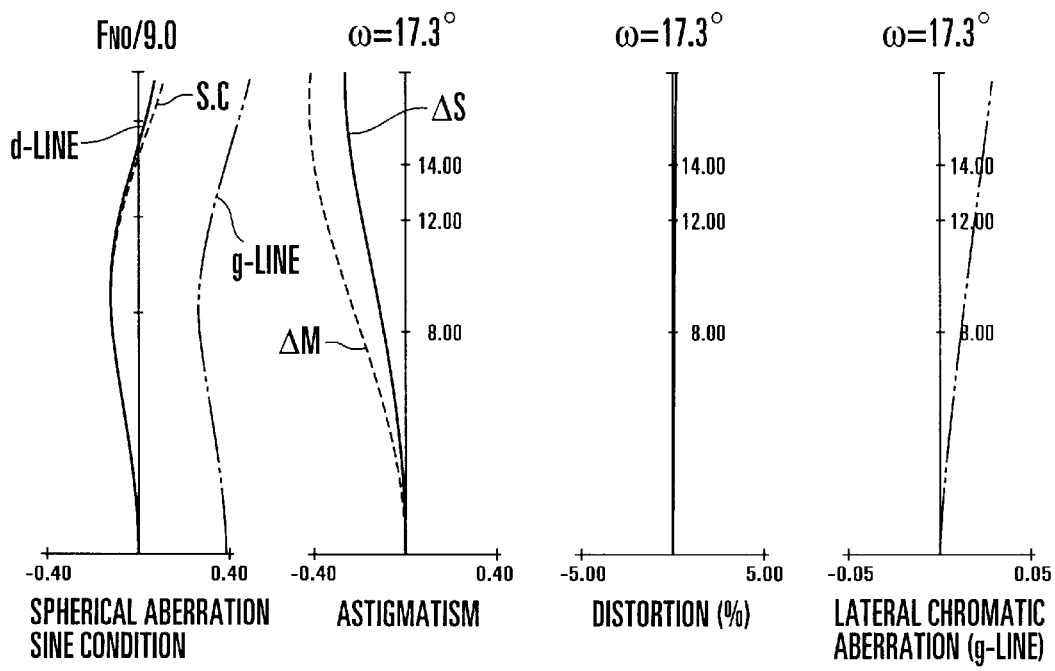
FIG.20C1 FIG.20C2 FIG.20C3 FIG.20C4

FIG. 21
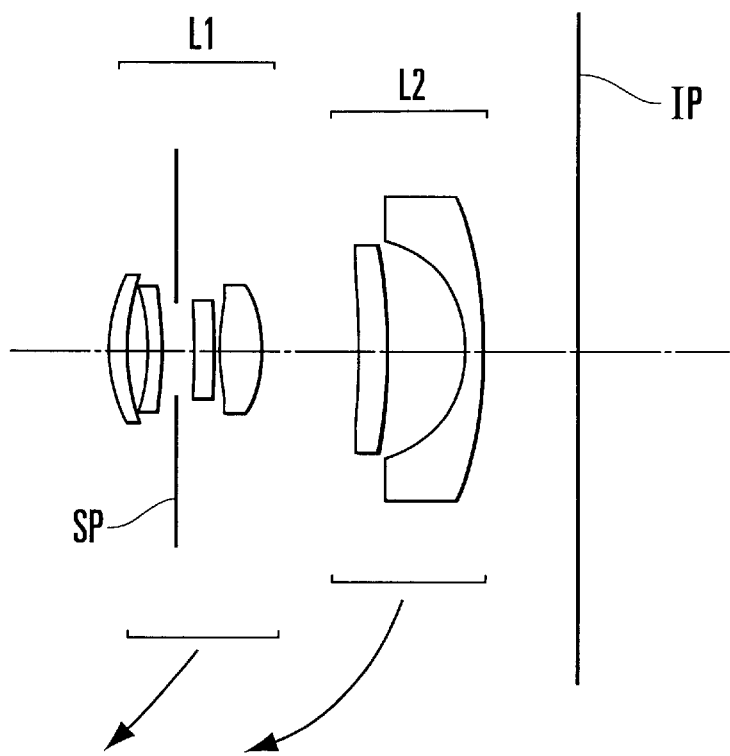
FIG.22A1 FIG.22A2 FIG.22A3 FIG.22A4
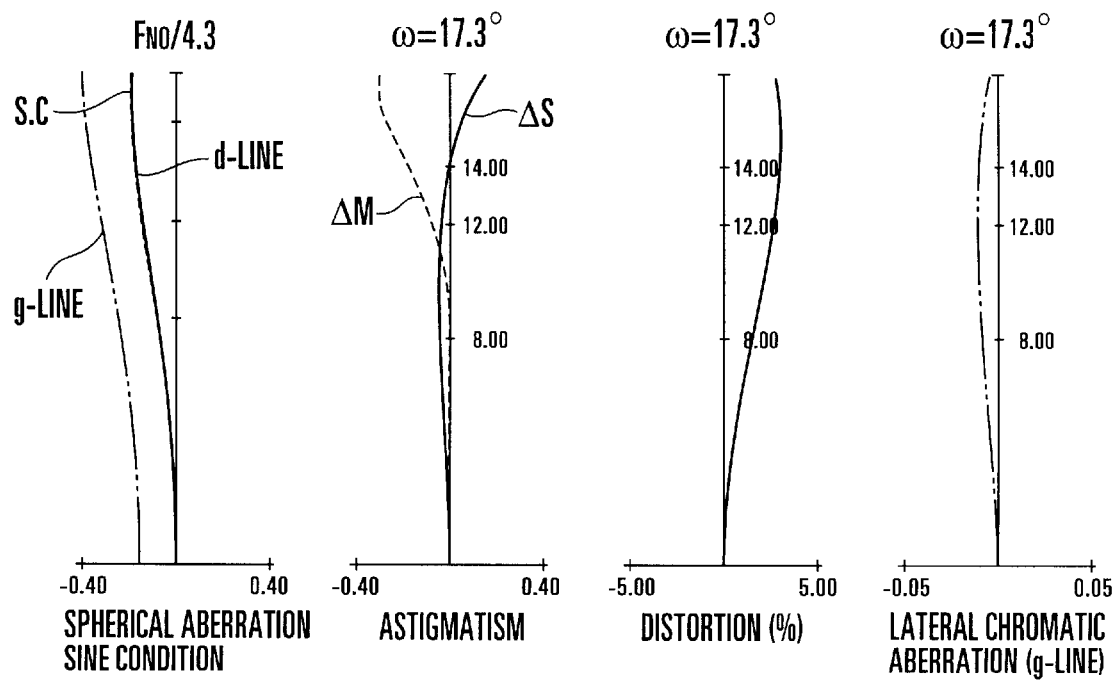

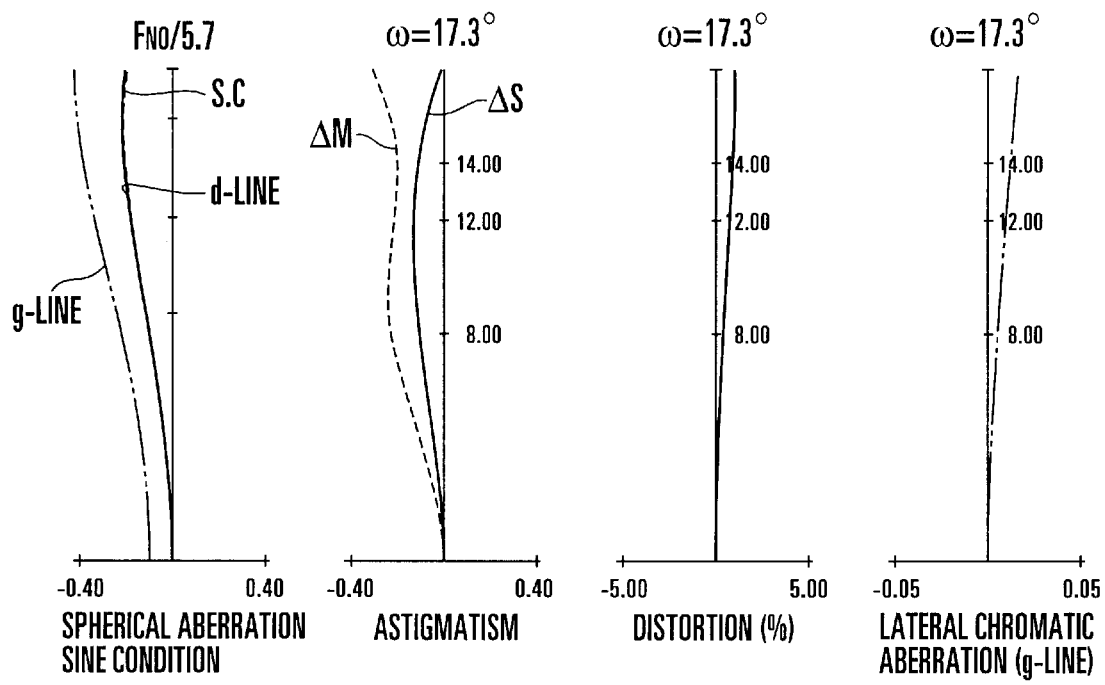
FIG.22B1 FIG.22B2 FIG.22B3 FIG.22B4
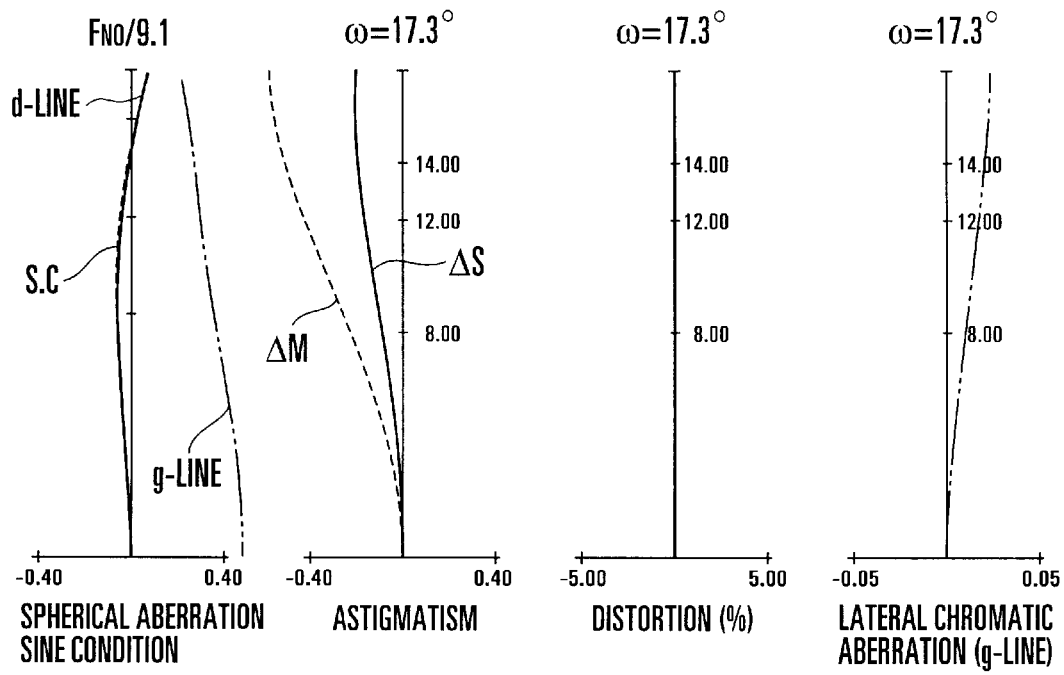
FIG.22C1 FIG.22C2 FIG.22C3 FIG.22C4

ZOOM LENS AND OPTICAL APPARATUS HAVING THE SAME

BACKGROUND OF THE INVENTION

1. Field of the Invention

The present invention relates to a zoom lens, and more particularly, to a small-sized zoom lens having a high optical performance and having a relatively simple construction, which is most suitable for a camera having a relatively short back focal distance among lens-shutter cameras, such as video cameras, still cameras and digital cameras.

2. Description of Related Art

In recent years, with the advance of working technology for aspherical lenses, there have been proposed a variety of zoom lenses in which a number of aspherical lenses are used for reducing the number of lens elements, shortening the total length of the lens and improving the optical performance.

However, since the aspherical lens is difficult to form as compared with a spherical lens, it is desirable to limit the number of aspherical lenses to the necessary minimum. For that purpose, it is necessary to effectively dispose aspherical lenses in an optical system.

In the meantime, as one type of the simplest zoom lenses, there are known two-unit zoom lenses each composed of two lens units.

Among the two-unit zoom lenses, heretofore, there have been proposed, as zoom lenses for use with a lens-shutter camera which requires no long back focal distance, a variety of two-unit zoom lenses each of which is composed of, in order from an object side, a first lens unit of positive refractive power and a second lens unit of negative refractive power, and in which a variation of magnification is effected by varying an axial air separation between the two lens units.

For example, in Japanese Laid-Open Patent Applications No. Sho 56-128911 (corresponding to U.S. Pat. No. 4,682,860), No. Sho 57-201213 (corresponding to U.S. Pat. No. 4,682,860), No. Sho 60-170816, No. Sho 60-191216 (corresponding to U.S. Pat. No. 4,659,186), No. Sho 62-56917, etc., there have been proposed small-sized zoom lenses each of which is composed of, in order from an object side, a first lens unit of positive refractive power and a second lens unit of negative refractive power, and in which a variation of magnification is effected by varying an interval between the two lens units.

According to the above publications, the positive-and-negative refractive power arrangement in order from an object side is adopted and the appropriate rule of design of each lens unit is set forth, thereby realizing a zoom lens whose back focal distance is relatively short, whose total length is shortened and which has a high optical performance.

Among the above publications, in Japanese Laid-Open Patent Application No. Sho 56-128911, there has been proposed a small-sized zoom lens in which the first lens unit is composed of four lenses, i.e., positive, negative, positive and positive lenses, and the second lens unit is composed of two lenses, i.e., positive and negative lenses, so that the entire lens system is simplified.

On the other hand, in Japanese Laid-Open Patent Application No. Sho 63-311224, there has been proposed a small-sized zoom lens in which the first lens unit is composed of four lenses, i.e., positive, negative, positive and positive lenses, the second lens unit is composed of two lenses, i.e., positive and negative lenses, and an aspheric surface is used in each of the two lens units, thereby improving an optical performance.

In addition, in Japanese Laid-Open Patent Application No. Hei 4-161914, there has been proposed a zoom lens in which the first lens unit is composed of four lenses, i.e., a positive lens, a negative lens, an aspherical lens and a positive lens, the second lens unit is composed of three lenses, i.e., positive, negative and negative lenses, and an aspheric surface is used in each of the three lens units.

Further, in Japanese Laid-Open Patent Applications No. Sho 62-90611, No. Sho 62-113120 and No.

Hei 3-116110, there has been proposed a two-unit zoom lens having a variable magnification ratio of 1.5 or thereabout in which the first lens unit is composed of positive, negative, positive and positive lenses, and the second lens unit is composed of two lenses, i.e., positive and negative lenses, or three lenses, i.e., positive, negative and negative lenses.

Furthermore, in Japanese Laid-Open Patent Applications No. Hei 9-211325 and No. Hei 10-48523, there has been proposed a small-sized zoom lens having a high optical performance in which the first lens unit is composed of a positive lens, a negative lens, an aspherical lens and a positive lens, the second lens unit is composed of a positive lens and a negative lens, and the aspherical lens is effectively disposed.

In the above-described two-unit zoom lens composed of two lens units, i.e., a first lens unit of positive refractive power and a second lens unit of negative refractive power, in order to obtain a high optical performance throughout the entire variable magnification range while minimizing the entire lens system, it is necessary to appropriately set a refractive power of each lens unit.

In general, if the refractive power of each of the first and second lens units is strengthened, it becomes easy to obtain a high variable magnification, and the amount of movement of each lens unit during the variation of magnification becomes small, so that it becomes possible to shorten the total length of the entire lens system. However, if the refractive power of each lens unit is merely strengthened, the variation of aberrations due to the variation of magnification becomes large, so that it becomes difficult to correct the variation of aberrations well.

For example, in the above-mentioned Japanese Laid-Open Patent Applications No. Sho 63-311224, No. Hei 4-161914, No. Sho 62-90611, No. Sho 62-113120 and No. Hei 3-116110, since the refractive power of each lens unit is relatively weak, the distance from the first lens surface to the last lens surface in the telephoto end tends to become long.

Further, in the above-mentioned Japanese Laid-Open Patent Application No. Hei 9-211325, a plastic aspherical lens is used in each lens unit, thereby attaining a zoom lens which is easy to produce, but the distance from the first lens surface to the last lens surface in the telephoto end tends to become long.

BRIEF SUMMARY OF THE INVENTION

The present invention has been made to improve the conventional two-unit zoom lenses, and an object of the invention is to provide a zoom lens having a high optical performance and having a simple construction while attaining the minimization of the entire lens system, in particular, attaining the thin lens system.

To attain the above object, in accordance with a first aspect of the invention, there is provided a zoom lens comprising, in order from an object side to an image side, a first lens unit of positive refractive power, the first lens unit comprising, in order from the object side to the image side, a first lens of positive refractive power having a convex surface facing the object side, a second lens of negative refractive power, a third lens of positive refractive power of meniscus form having a convex surface facing the image side and having an aspheric surface, and a fourth lens of positive refractive power, and a second lens unit of negative refractive power, wherein a variation of magnification is effected by varying an interval between the first lens unit and the second lens unit, and the following conditions are satisfied:

$$0.40 < f1/fw < 0.80 \quad (1)$$

$$0.40 < |f2|/fw < 0.90 \quad (2)$$

where fw is a focal length of the zoom lens in a wide-angle end, f1 is a focal length of the first lens unit, and f2 is a focal length of the second lens unit.

Further, in accordance with a second aspect of the invention, there is provided a zoom lens comprising, in order from an object side to an image side, a first lens unit of positive refractive power, the first lens unit consisting of, in order from the object side to the image side, a first lens subunit, a stop, and a second lens subunit of positive refractive power having an aspherical lens, and a second lens unit of negative refractive power, wherein a variation of magnification is effected by varying an interval between the first lens unit and the second lens unit, and the following conditions are satisfied:

$$0.40 < f1/fw < 0.80 \quad (9)$$

$$0.40 < |f2|/fw < 0.70 \quad (10)$$

$$1.46 < N13 < 1.62 \quad (11)$$

$$|fw/f13| < 0.60 \quad (12)$$

$$0.40 < Lp/D1 < 0.70 \quad (13)$$

where f1 and f2 are focal lengths of the first lens unit and the second lens unit, respectively, fw is a focal length of the zoom lens at a wide-angle end, N13 is a refractive index of material of the aspherical lens included in the second lens subunit, f13 is a focal length of the aspherical lens, D1 is a total length of the first lens unit, and Lp is a distance between the stop and a lens surface disposed on the most image side of the first lens unit.

Further, in accordance with a third aspect of the invention, there is provided a zoom lens comprising, in order from an object side to an image side, a first lens unit of positive refractive power, the first lens unit consisting of, in order from the object side to the image side, a first lens subunit consisting of a first lens of positive refractive power and a second lens of negative refractive power, a stop, and a second lens subunit consisting of a third lens made of plastic material and having an aspheric surface and a fourth lens of positive refractive power, and a second lens unit of negative refractive power, wherein a variation of magnification is effected by varying an interval between the first lens unit and the second lens unit, and the following conditions are satisfied:

$$0.40 < f1/fw < 0.80 \quad (9)$$

$$0.40 < |f2|/fw < 0.70 \quad (10)$$

$$1.46 < N13 < 1.62 \quad (11)$$

$$|fw/f13| < 0.60 \quad (12)$$

$$0.40 < Lp/D1 < 0.70 \quad (13)$$

$$0.01 < d34/d1 < 0.10 \quad (14)$$

where f1 and f2 are focal lengths of the first lens unit and the second lens unit, respectively, fw is a focal length of the zoom lens at a wide-angle end, N13 is a refractive index of material of the third lens, f13 is a focal length of the third lens, D1 is a total length of the first lens unit, Lp is a distance between the stop and a lens surface disposed on the most image side of the first lens unit, and d34 is an air separation between the third lens and the fourth lens.

Further, in accordance with a fourth aspect of the invention, there is provided an optical apparatus comprising a zoom lens according to any one of the first to third aspects of the invention.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 1 is a sectional view showing a zoom lens according to a numerical example 1.

FIGS. 2A1 to 2A3 and 2B1 to 2B3 are aberration diagrams showing the various aberrations at the wide-angle end and the telephoto end, respectively, of the zoom lens according to the numerical example 1.

FIG. 3 is a sectional view showing a zoom lens according to a numerical example 2.

FIGS. 4A1 to 4A3 and 4B1 to 4B3 are aberration diagrams showing the various aberrations at the wide-angle end and the telephoto end, respectively, of the zoom lens according to the numerical example 2.

FIG. 5 is a sectional view showing a zoom lens according to a numerical example 3.

FIGS. 6A1 to 6A3 and 6B1 to 6B3 are aberration diagrams showing the various aberrations at the wide-angle end and the telephoto end, respectively, of the zoom lens according to the numerical example 3.

FIG. 7 is a sectional view showing a zoom lens according to a numerical example 4.

FIGS. 8A1 to 8A3 and 8B1 to 8B3 are aberration diagrams showing the various aberrations at the wide-angle end and the telephoto end, respectively, of the zoom lens according to the numerical example 4.

FIG. 9 is a sectional view showing a zoom lens according to a numerical example 5.

FIGS. 10A1 to 10A3 and 10B1 to 10B3 are aberration diagrams showing the various aberrations at the wide-angle end and the telephoto end, respectively, of the zoom lens according to the numerical example 5.

FIG. 11 is a sectional view showing a zoom lens according to a numerical example 6 in the wide-angle end.

FIGS. 12A1 to 12A4, 12B1 to 12B4 and 12C1 to 12C4 are aberration diagrams showing the various aberrations at the wide-angle end, the middle focal length position and the telephoto end, respectively, of the zoom lens according to the numerical example 6.

FIG. 13 is a sectional view showing a zoom lens according to a numerical example 7 at the wide-angle end.

FIGS. 14A1 to 14A4, 14B1 to 14B4 and 14C1 to 14C4 are aberration diagrams showing the various aberrations at the wide-angle end, the middle focal length position and the telephoto end, respectively, of the zoom lens according to the numerical example 7.

FIG. 15 is a sectional view showing a zoom lens according to a numerical example 8 at the wide-angle end.

FIGS. 16A1 to 16A4, 16B1 to 16B4 and 16C1 to 16C4 are aberration diagrams showing the various aberrations at the wide-angle end, the middle focal length position and the telephoto end, respectively, of the zoom lens according to the numerical example 8.

FIG. 17 is a sectional view showing a zoom lens according to a numerical example 9 at the wide-angle end.

FIGS. 18A1 to 18A4, 18B1 to 18B4 and 18C1 to 18C4 are aberration diagrams showing the various aberrations at the wide-angle end, the middle focal length position and the telephoto end, respectively, of the zoom lens according to the numerical example 9.

FIG. 19 is a sectional view showing a zoom lens according to a numerical example 10 at the wide-angle end.

FIGS. 20A1 to 20A4, 20B1 to 20B4 and 20C1 to 20C4 are aberration diagrams showing the various aberrations at the wide-angle end, the middle focal length position and the telephoto end, respectively, of the zoom lens according to the numerical example 10.

FIG. 21 is a sectional view showing a zoom lens according to a numerical example 11 at the wide-angle end.

FIGS. 22A1 to 22A4, 22B1 to 22B4 and 22C1 to 22C4 are aberration diagrams showing the various aberrations at the wide-angle end, the middle focal length position and the telephoto end, respectively, of the zoom lens according to the numerical example 11.

DETAILED DESCRIPTION OF THE INVENTION

Figure 23A:
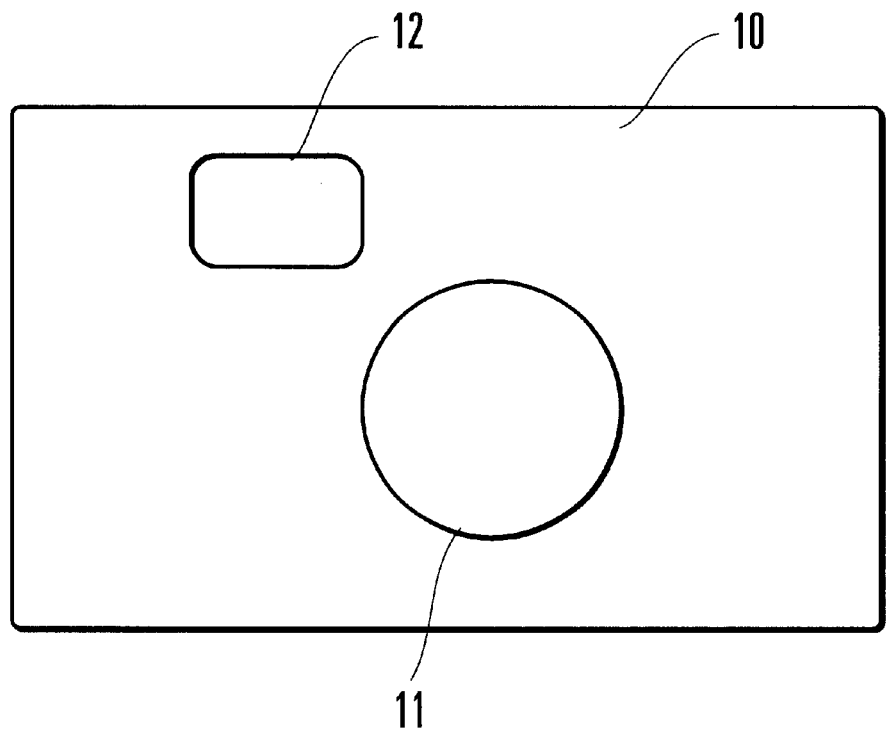
FIGS. 23A and 23B are schematic diagrams showing the essential parts of a photographing apparatus having a zoom lens according to any one of the numerical examples 1 to 11.

Hereinafter, preferred embodiments of the invention will be described in detail with reference to the drawings.

First, an embodiment corresponding to the first aspect of the invention will be described below.

FIGS. 1, 3, 5, 7 and 9 are sectional views showing zoom lenses according to numerical examples 1 to 5 corresponding to the first aspect of the invention, respectively.

In FIGS. 1, 3, 5, 7 and 9, L1 denotes a first lens unit of positive refractive power, and L2 denotes a second lens unit of negative refractive power. Variation of magnification from the wide-angle end to the telephoto end is effected by moving the first and second lens units toward the object side as indicated by the arrows while decreasing the interval between the first and second lens units. SP stands for a stop, which is disposed on the image side of the first lens unit, in the case of the present embodiment, and is arranged to move integrally with the first lens unit during the variation of magnification. IP stands for an image plane.

In the present embodiment, with the zoom system and the lens configuration adopted as described above, the zoom lens has a variable magnification ratio of 2 or thereabout while shortening the total length of the entire lens system, in particular, shortening the total length at the wide-angle end and has a high optical performance over the entire variable magnification range with the variation of aberrations due to the variation of magnification corrected well.

Next, the characteristic features of the lens configuration of the zoom lens according to the first aspect of the invention will be described.

In the two-unit zoom lens according to the first aspect of the invention, since the image forming performance of the first lens unit is enlarged while being corrected by the second lens unit, it is desirable that the first lens unit has such a lens configuration as to be capable of correcting aberrations well. Accordingly, the first lens unit takes the basic form of a triplet lens composed of three lenses, i.e., positive, negative and positive lenses, capable of correcting aberrations well as a mono-focal lens. Then, the positive third lens of the triplet lens is divided into a positive aspherical lens and a positive lens, so that the first lens unit is composed of four lenses, i.e., positive, negative, positive and positive lenses, capable of correcting aberrations well as a whole.

To sum up, the zoom lens according to the first aspect of the invention comprises, two lens units, i.e., in order from the object side to the image side, a first lens unit of positive refractive power and a second lens unit of negative refractive power, wherein a variation of magnification is effected by varying the interval between the first and second lens units. Then, the first lens unit comprises a positive first lens, a negative second lens, a positive third lens which is an aspherical lens, and a positive fourth lens. Further, the zoom lens has such a lens configuration as to satisfy the above-mentioned conditions (1) and (2).

In the case of a two-unit zoom lens, the correction of aberrations has to be made to some degree in the first lens unit alone, as described above. In general, if a positive refractive power of the first lens unit is strengthened with the advance of minimization of the lens system, spherical aberration tends to be under-corrected. Therefore, the first lens unit is provided with an aspheric surface having such a shape that a negative refractive power becomes stronger progressively from the center to the margin. In particular, with the further advance of minimization of the lens system, the amount of variation of spherical aberration from the wide-angle end up to the telephoto end is increased, so that it becomes difficult to correct the spherical aberration well. However, by making the third lens of the first lens unit into a meniscus form having a convex surface facing the image side, it becomes possible to effectively correct aberrations.

Further, in the present embodiment, the second lens unit comprises a positive first lens having an aspheric surface, and a negative second lens, thereby correcting aberrations well. In particular, since the second lens unit has an off-axial light beam passing through at greatly different positions thereof with the wide-angle end and the telephoto end, an aspherical lens is provided in the second lens unit so that off-axial aberration can be corrected in good balance from the wide-angle end up to the telephoto end. Further, since the second lens unit has a negative refractive power, in order to correct aberrations over the entire variable magnification range, the aspheric surface has such a shape that a positive refractive power becomes stronger progressively from the center to the margin.

Next, the technical significance of each of the above-mentioned conditions (1) and (2) is described.

The condition (1) is concerned with the ratio of the focal length of the first lens unit to the focal length of the entire lens system at the wide-angle end, and aims at taking the balance between the minimization of the first lens unit and the high optical performance. When the lower limit of the condition (1) is exceeded, although being advantageous from the point of view of the minimization, in particular, the amount of variation of spherical aberration from the wide-angle end up to the telephoto end in the first lens unit is increased disadvantageously, so that it becomes difficult to correct aberrations. Conversely, when the upper limit is exceeded, although being advantageous from the point of view of the aberration correction, the size of the first lens unit is increased disadvantageously.

In order to aim at taking the higher balance between the minimization of the first lens unit and the high optical performance, it is preferred that the lower limit of the condition (1) is set to "0.45". In addition, in order to aim at the further minimization of the first lens unit, it is preferred that the upper limit of the condition (1) is set to "0.75".

The condition (2) is concerned with the ratio of the focal length of the second lens unit to the focal length of the entire lens system at the wide-angle end, and aims at taking the balance between the minimization of the second lens unit and the high optical performance. When the lower limit of the condition (2) is exceeded with the refractive power of the second lens unit becoming too strong, although the amount of movement of the second lens unit during the variation of magnification is decreased, since an off-axial light beam passes through at the position relatively distant from the optical axis at the wide-angle end, in particular, the distortion at the wide-angle end deteriorates, so that it becomes difficult to correct aberrations. Conversely, when the upper limit is exceeded, the amount of movement of the second lens unit during the variation of magnification is increased, so that the size of the second lens unit is increased disadvantageously.

In order to aim at obtaining the higher optical performance, it is preferred that the lower limit of the condition (2) is set to "0.45". In addition, in order to aim at the further minimization of the second lens unit and the shortening of the total length of the entire lens system in the telephoto end, it is preferred that the upper limit of the condition (2) is set to "0.75".

According to the first aspect of the invention, with the above-described structure and conditions satisfied, a small-sized zoom lens having a high optical performance can be realized. Further, in order to attain a higher optical performance in the zoom lens according to the first aspect of the invention, it is desirable to satisfy at least one of the following conditions.

(A1) The following conditions are satisfied:

$$0.01 < ft/fG3 < 2.30 \quad (3)$$

$$nG3 > 1.630 \quad (4)$$

where fG3 is a focal length of the third lens of the first lens unit, nG3 is a refractive index of material of the third lens of the first lens unit, and ft is a focal length of the zoom lens in the telephoto end.

The condition (3) is concerned with the ratio of the focal length of the entire lens system in the telephoto end to the focal length of the third lens of positive refractive power having an aspheric surface included in the first lens unit, and aims at setting an appropriate refractive power to the aspherical lens for the purpose of realizing the minimization of the first lens unit.

When the lower limit of the condition (3) is exceeded with the refractive power of the third lens of the first lens unit becoming too weak, the burden of a positive refractive power of the first lens unit concentrates on the fourth lens of the first lens unit, so that, in particular, it becomes difficult to correct curvature of field at the wide-angle end, disadvantageously. Conversely, when the upper limit is exceeded with the refractive power of the third lens of the first lens unit becoming too strong, the amount of variation of spherical aberration due to the variation of magnification is increased disadvantageously, and, further, the total length of the first lens unit has to be increased to some degree in order to maintain a high optical performance. In order to obtain a higher optical performance, it is preferred that the upper limit of the condition (3) is set to "2.00".

The condition (4) is provided for defining the refractive index of material of the third lens of positive refractive power having an aspheric surface included in the first lens unit, and aims at obtaining a high optical performance while attaining the minimization of the first lens unit.

When the lower limit of the condition (4) is exceeded with the material having a low refractive index used for the third lens of the first lens unit, the radius of curvature of a lens surface on the object side of the third lens of the first lens unit is caused to become large, and, thus, the meniscus form convex toward the image side becomes weak, so that the variation of spherical aberration due to the variation of magnification is increased disadvantageously, and, further, it becomes difficult to correct spherical aberration and coma concurrently. In order to obtain a higher optical performance, it is preferred that the lower limit of the condition (4) is set to "1.650".

(A2) The following condition is satisfied:

$$0.02 < (r3+r4)/(r4-r3) < 0.60 \quad (5)$$

where r3 is a radius of curvature of a lens surface on the object side of the second lens of the first lens unit, and r4 is a radius of curvature of a lens surface on the image side of the second lens of the first lens unit.

The condition (5) is provided for setting the lens shape of the second lens of the first lens unit for the purpose of correcting well the various aberrations, particularly, at the wide-angle end.

When the lower limit of the condition (5) is exceeded, in particular, it becomes difficult to set such a lens shape as to correct coma at the wide-angle end occurring in the fourth lens of the first lens unit. Conversely, when the upper limit is exceeded, in particular, it becomes difficult to set such a lens shape as to correct distortion at the wide-angle end occurring in the second lens unit. In order to set a lens shape capable of obtaining a higher optical performance, it is preferred that the lower limit of the condition (5) is set to "0.04". Further, it is preferred that the upper limit of the condition (5) is set to "0.50"

(A3) The following conditions are satisfied:

$$0.30 < fG4/fw < 0.80 \quad (6)$$

$$0.02 < DG4/ft < 0.09 \quad (7)$$

where fG4 is a focal length of the fourth lens of the first lens unit, and DG4 is a lens thickness of the fourth lens of the first lens unit.

When the lower limit of the condition (6) is exceeded with the refractive power of the fourth lens of the first lens unit becoming too strong, in particular, spherical aberration becomes under-corrected. Further, while the spherical aberration occurring in the fourth lens of the first lens unit is corrected by the aspheric surface of the third lens of the first lens surface, if the refractive power of the fourth lens of the first lens unit becomes too strong, the amount of occurrence of the spherical aberration at the aspheric surface of the third lens of the first lens unit for correcting the spherical aberration occurring in the fourth lens of the first lens unit is caused to increase, so that a large canceling relationship takes place. Accordingly, the deterioration of an optical performance taking place when a deviation has occurred between the vertex of the aspheric surface of the third lens of the first lens unit and the optical axis of the fourth lens of the first lens unit is increased, so that the mass productivity is lowered disadvantageously. Further, in particular, the spherical aberration at the wide-angle end becomes bad disadvantageously.

When the upper limit of the condition (6) is exceeded with the refractive power of the fourth lens of the first lens unit becoming too weak, the variation of spherical aberration due to the variation of magnification becomes large, and, with the refractive power of the first lens unit becoming weak, the amount of movement of the first lens unit during the variation of magnification is increased, so that the size of the entire lens system is increased disadvantageously. In order to attaining the further minimization of the entire lens system, it is preferred that the lower limit of the condition (6) is set to "0.35". Further, it is preferred that the upper limit of the condition (6) is set to "0.70".

The condition (7) is concerned with the ratio of the lens thickness of the fourth lens of the first lens unit to the focal length of the entire lens system in the telephoto end, and aims at maintaining the balance between the minimization and the optical performance. When the lower limit of the condition (7) is exceeded, the variation of longitudinal chromatic aberration due to the variation of magnification comes to tend to increase, so that it becomes difficult to obtain a good optical performance throughout the entire variable magnification range. Conversely, when the upper limit is exceeded, the size of the first lens unit is increased, so that, in particular, the coma at the wide-angle end becomes bad disadvantageously.

(A4) The following condition is satisfied:

$$0.50 < fG1/fw < 3.00 \quad (8)$$

where fG1 is a focal length of the first lens of the first lens unit.

The condition (8) is concerned with the ratio of the focal length of the first lens of the first lens unit to the focal length of the entire lens system at the wide-angle end, and aims at obtaining a high optical performance.

When the lower limit of the condition (8) is exceeded with the refractive power of the first lens of the first lens unit becoming too strong, in particular, the distortion at the wide-angle end is increased in the positive direction, and the astigmatism also becomes bad disadvantageously. Conversely, when the upper limit is exceeded with the refractive power of the first lens of the first lens unit becoming too weak, the variation of longitudinal chromatic aberration due to the variation of magnification is increased, so that a relatively higher variable magnification ratio causes a more disadvantageous effect. Further, it becomes difficult to correct well lateral chromatic aberration at the wide-angle end.

(A5) The first lens unit comprises four lenses, i.e., a positive first lens of meniscus form having a convex surface facing the object side, a negative second lens both lens surfaces of which are concave, a positive third lens of meniscus form having a convex surface facing the image side, and a positive fourth lens both lens surfaces of which are convex. By this construction, mainly, spherical aberration and coma, and, further, chromatic aberration or the like, are corrected well.

(A6) The second lens unit comprises two lenses, i.e., a positive first lens of meniscus form having an aspheric surface and having a convex surface facing the image side, and a negative second lens of meniscus form having a convex surface facing the image side. By this construction, off-axial aberration is corrected well.

Next, numerical data of the numerical examples 1 to 5 are shown. In the numerical data of the numerical examples 1 to 5, Ri is the radius of curvature of the i-th surface, when counted from the object side, Di is the i-th optical member thickness or air separation, when counted from the object side, and Ni and vi are respectively the refractive index and Abbe number of the material of the i-th optical member, when counted from the object side.

The shape of an aspheric surface is expressed in the coordinates with an X axis in the optical axis direction and a Y axis in the direction perpendicular to the optical axis, the direction in which light advances being taken as positive, by the following equation:

$$X = \frac{(1/R)Y^2}{1 + \sqrt{1 - (Y/R)^2}} + BY^4 + CY^6 + DY^8 + EY^{10}$$

where R is the radius of osculating sphere, and B, C, D and E are aspheric coefficients.

Further, for example, the indication of "e-X" means "$10^{-X}$". The values of the factors in the above-mentioned conditions (1) to (8) for the numerical examples 1 to 5 are listed in Table-1.

NUMERICAL EXAMPLE 1

| f = 32.5–65.0 | Fno = 4.60–6.70 | 2ω = 67.3–36.8 | |
|---|---|---|---|
| R1 = 13.793 | D1 = 2.30 | N1 = 1.487490 | v1 = 70.2 |
| R2 = 58.836 | D2 = 0.96 | | |
| R3 = −19.302 | D3 = 1.25 | N2 = 1.834000 | v2 = 37.2 |
| R4 = 42.484 | D4 = 0.80 | | |
| R5 = −38.944 | D5 = 1.88 | N3 = 1.688931 | v3 = 31.1 |
| *R6 = −23.621 | D6 = 0.92 | | |
| R7 = 25.149 | D7 = 3.80 | N4 = 1.487490 | v4 = 70.2 |
| R8 = −10.909 | D8 = 0.80 | | |
| R9 = Stop | D9 = Variable | | |
| *R10 = −32.913 | D10 = 2.62 | N5 = 1.688931 | v5 = 31.1 |
| R11 = −20.182 | D11 = 3.70 | | |
| R12 = −8.892 | D12 = 1.40 | N6 = 1.772499 | v6 = 49.6 |
| R13 = −39.435 | | | |

| Variable | Focal length | | |
|---|---|---|---|
| Separation | 32.5 | 42.0 | 65.0 |
| D9 | 8.53 | 5.61 | 2.10 |

*Aspheric Surface

Aspheric Coefficients:

| R6 | B = 1.36525e−04 | C = 1.27898e−06 | D = 2.77586e−08 |
|---|---|---|---|
| R10 | B = 7.88879e−05 | C = 2.34579e−07 | D = 1.75997e−08 |
| | E = −1.06576e−10 | | |

NUMERICAL EXAMPLE 2

| f = 32.5–65.0 | Fno = 4.60–6.70 | 2ω = 67.3–36.8 | |
|---|---|---|---|
| R1 = 14.571 | D1 = 2.30 | N1 = 1.487490 | v1 = 70.2 |
| R2 = 56.790 | D2 = 0.79 | | |
| R3 = −22.064 | D3 = 1.37 | N2 = 1.834000 | v2 = 37.2 |
| R4 = 40.560 | D4 = 0.64 | | |

-continued

| | | | |
|---|---|---|---|
| R5 = −60.126 | D5 = 1.75 | N3 = 1.688931 | ν3 = 31.1 |
| *R6 = −31.198 | D6 = 1.51 | | |
| R7 = 26.838 | D7 = 3.80 | N4 = 1.487490 | ν4 = 70.2 |
| R8 = −10.920 | D8 = 0.60 | | |
| R9 = Stop | D9 = Variable | | |
| *R10 = −31.825 | D10 = 2.67 | N5 = 1.730770 | ν5 = 40.6 |
| R11 = −20.154 | D11 = 3.71 | | |
| R12 = −8.978 | D12 = 1.40 | N6 = 1.712995 | ν6 = 53.8 |
| R13 = −47.202 | | | |

| Variable | Focal length | | |
|---|---|---|---|
| Separation | 32.5 | 42.1 | 65.0 |
| D9 | 9.22 | 6.04 | 2.25 |

*Aspheric Surface

Aspheric Coefficients:

| | | | |
|---|---|---|---|
| R6 | B = 1.41983e−04 | C = 1.49595e−06 | D = 2.36383e−08 |
| R10 | B = 6.99867e−05 | C = 3.82348e−07 | D = 5.29087e−09 |
| | E = 3.39176e−11 | | |

NUMERICAL EXAMPLE 3

| f = 36.0–70.0 | Fno = 4.60–7.00 | 2ω = 62.1–34.4 | |
|---|---|---|---|
| R1 = 13.792 | D1 = 2.30 | N1 = 1.516330 | ν1 = 64.2 |
| R2 = 53.872 | D2 = 0.70 | | |
| R3 = −26.228 | D3 = 1.00 | N2 = 1.834000 | ν2 = 37.2 |
| R4 = 41.932 | D4 = 0.75 | | |
| R5 = −37.461 | D5 = 1.00 | N3 = 1.688931 | ν3 = 31.1 |
| *R6 = −36.830 | D6 = 1.53 | | |
| R7 = 28.041 | D7 = 3.90 | N4 = 1.516330 | ν4 = 64.2 |
| R8 = −11.327 | D8 = 0.60 | | |
| R9 = Stop | D9 = Variable | | |
| *R10 = −37.656 | D10 = 2.51 | N5 = 1.730770 | ν5 = 40.6 |
| R11 = −23.953 | D11 = 4.13 | | |
| R12 = −8.822 | D12 = 1.20 | N6 = 1.712995 | ν6 = 53.8 |
| R13 = −46.093 | | | |

| Variable | Focal length | | |
|---|---|---|---|
| Separation | 36.0 | 45.6 | 70.0 |
| D9 | 7.65 | 5.17 | 1.96 |

*Aspheric Surface

Aspheric Coefficients:

| | | | |
|---|---|---|---|
| R6 | B = 1.53755e−04 | C = 1.21626e−06 | D = 2.30336e−08 |
| | E = −3.18818e−15 | | |
| R10 | B = 7.59815e−05 | C = 3.10235e−07 | D = 7.51687e−09 |
| | E = −1.01328e−11 | | |

NUMERICAL EXAMPLE 4

| f = 36.0–70.0 | Fno = 4.60–7.00 | 2ω = 62.0–34.3 | |
|---|---|---|---|
| R1 = 13.630 | D1 = 2.00 | N1 = 1.516330 | ν1 = 64.2 |
| R2 = 42.766 | D2 = 0.86 | | |
| R3 = −25.802 | D3 = 1.00 | N2 = 1.834000 | ν2 = 37.2 |
| R4 = 35.747 | D4 = 0.86 | | |
| R5 = −39.287 | D5 = 1.70 | N3 = 1.730770 | ν3 = 40.6 |
| *R6 = −32.580 | D6 = 1.60 | | |
| R7 = 28.869 | D7 = 4.00 | N4 = 1.516330 | ν4 = 64.2 |
| R8 = −11.409 | D8 = 0.60 | | |
| R9 = Stop | D9 = Variable | | |
| *R10 = −36.939 | D10 = 2.50 | N5 = 1.730770 | ν5 = 40.6 |
| R11 = −23.173 | D11 = 4.35 | | |
| R12 = −9.581 | D12 = 1.20 | N6 = 1.712995 | ν6 = 53.8 |
| R13 = −54.900 | | | |

| Variable | Focal length | | |
|---|---|---|---|
| Separation | 36.0 | 45.8 | 70.0 |
| D9 | 8.48 | 5.60 | 1.96 |

*Aspheric Surface

Aspheric Coefficients:

| | | | |
|---|---|---|---|
| R6 | B = 1.42641e−04 | C = 9.62281e−07 | D = 2.24512e−08 |
| R10 | B = 6.49244e−05 | C = −2.66451e−07 | D = 1.60957e−08 |
| | E = −1.12373e−10 | | |

NUMERICAL EXAMPLE 5

| f = 38.0–80.0 | Fno = 4.60–9.68 | 2ω = 59.3–30.3 | |
|---|---|---|---|
| R1 = 13.311 | D1 = 2.00 | N1 = 1.516330 | ν1 = 64.2 |
| R2 = 41.529 | D2 = 1.01 | | |
| R3 = −25.539 | D3 = 1.00 | N2 = 1.834000 | ν2 = 37.2 |
| R4 = 28.980 | D4 = 0.62 | | |
| *R5 = −98.111 | D5 = 1.70 | N3 = 1.730770 | ν3 = 40.6 |
| R6 = −33.715 | D6 = 2.06 | | |
| R7 = 42.504 | D7 = 3.00 | N4 = 1.516330 | ν4 = 64.2 |
| R8 = −12.055 | D8 = 0.60 | | |
| R9 = Stop | D9 = Variable | | |
| *R10 = −42.797 | D10 = 2.50 | N5 = 1.688931 | ν5 = 31.1 |
| R11 = −24.091 | D11 = 4.24 | | |
| R12 = −9.806 | D12 = 1.20 | N6 = 1.772499 | ν6 = 49.6 |
| R13 = −40.154 | | | |

| Variable | Focal length | | |
|---|---|---|---|
| Separation | 38.0 | 50.4 | 80.0 |
| D9 | 10.49 | 6.83 | 2.64 |

*Aspheric Surface

Aspheric Coefficients:

| | | | |
|---|---|---|---|
| R5 | B = −1.17799e−04 | C = −9.04097e−07 | D = −8.60595e−09 |
| R10 | B = 6.87992e−05 | C = −1.06680e−07 | D = 1.37147e−08 |
| | E = −8.45566e−11 | | |

TABLE 1

| | Numerical Example | | | | |
|---|---|---|---|---|---|
| Condition | 1 | 2 | 3 | 4 | 5 |
| (1) 0.40 < f1/fw < 0.80 | 0.65 | 0.67 | 0.60 | 0.63 | 0.65 |
| (2) 0.40 < \|f2\|/fw < 0.90 | 0.61 | 0.64 | 0.54 | 0.60 | 0.60 |
| (3) 0.01 < ft/fG3 < 2.30 | 0.79 | 0.71 | 0.05 | 0.30 | 1.15 |
| (4) nG3 > 1.630 | 1.689 | 1.689 | 1.689 | 1.731 | 1.731 |
| (5) 0.02 < (r3 + r4)/(r4−r3) < 0.60 | 0.38 | 0.30 | 0.31 | 0.16 | 0.06 |

TABLE 1-continued

| | Numerical Example | | | | |
|---|---|---|---|---|---|
| Condition | 1 | 2 | 3 | 4 | 5 |
| (6) 0.30 < fG4/fw < 0.80 | 0.50 | 0.51 | 0.45 | 0.46 | 0.49 |
| (7) 0.02 < DG4/ft < 0.09 | 0.06 | 0.06 | 0.06 | 0.06 | 0.04 |
| (8) 0.50 < fG1/fw < 3.00 | 1.12 | 1.22 | 0.98 | 1.05 | 0.97 |

As described above, according to the embodiment corresponding to the first aspect of the invention, in the so-called two-unit zoom lens, the lens configuration of each lens unit is appropriately set, and an aspherical lens is effectively used. Accordingly, it is possible to attain a small-sized zoom lens whose total length is shortened and which has a high optical performance throughout the entire variable magnification range.

Next, embodiments corresponding to the second and third aspects of the invention will be described.

FIGS. 11, 13, 15, 17, 19 and 21 are sectional views respectively showing zoom lenses according to numerical examples 6 to 11 corresponding to the second and third aspects of the invention at the wide-angle end. FIGS. 12A1 to 12A4, 12B1 to 12B4 and 12C1 to 12C4, FIGS. 14A1 to 14A4, 14B1 to 14B4 and 14C1 to 14C4, FIGS. 16A1 to 16A4, 16C1 to 16C4, FIGS. 18A1 to 18A4, 18B1 to 18B4 and 18C1 to 18C4, FIGS. 20A1 to 20A4, 20B1 to 20B4 and 20C1 to 20C4 and FIGS. 22A1 to 22A4, 22B1 to 22B4 and 22C1 to 22C4 are aberration diagrams showing the various aberrations at the wide-angle end, the middle focal length position and the telephoto end of the zoom lenses according to the numerical examples 6 to 11, respectively.

In FIGS. 11, 13, 15, 17, 19 and 21, L1 denotes a first lens unit of positive refractive power, and L2 denotes a second lens unit of negative refractive power. Variation of magnification is effected by moving the first and second lens units toward the object side while decreasing the interval between the first and second lens units.

SP stands for a stop, which is disposed within the first lens unit. IP stands for an image plane.

In the present embodiments, the above zoom system and the above arrangement of refractive power of the first and second lens units are adopted, so that the zoom lens has a high optical performance while shortening the total length of the entire lens system.

Next, characteristic features of the zoom lens composed of two lens units according to the present embodiments are described. In minimizing the two-unit zoom lens composed of the first lens unit of positive refractive power and the second lens unit of negative refractive power, the setting of refractive power of each lens unit becomes important.

In particular, since the first lens unit moves greatly toward the object side in the telephoto end, the shortening of the total length of the entire lens system is desirable. In general, if a refractive power of each lens unit is strengthened, the shortening of the entire lens system can be attained while assuring a predetermined variable magnification ratio. However, the amount of aberration occurring at each lens unit is increased, so that it becomes difficult to obtain a high optical performance throughout the entire variable magnification range.

In particular, since an image formed by the first lens unit is enlarged by the second lens unit at the telephoto end, it is necessary that aberrations be corrected well to some degree by the first lens unit alone.

Accordingly, in the zoom lens composed of two lens units according to the second and third aspects of the invention, a refractive power of each lens unit is appropriately set, and the construction of the first lens unit is arranged such that a stop is disposed within the first lens unit and a refractive power and a refractive index of material of the aspherical lens of the first lens unit are appropriately set. By such an arrangement, the zoom lens has a high optical performance while attaining the minimization, in particular, the thinning, of the entire lens system.

More specifically, the first lens unit is composed of, in order from the object side, a first lens subunit, a stop and a second lens subunit. While, in an ordinary zoom lens composed of two lens units, a stop is disposed on the most image side of the first lens unit, in the zoom lens according to the second and third aspects of the invention, the stop is disposed within the first lens unit and a plastic aspherical lens is disposed within the second lens subunit, so that the spherical aberration occurring in the first lens unit is corrected well. By this construction, the variation of spherical aberration due to the variation of magnification is suppressed and, as a result, the spherical aberration in the telephoto end is corrected, so that a refractive power of each lens unit can be strengthened to contribute to the minimization of the entire lens system. Further, a plastic lens is apt to change its shape and its optical characteristic owing to the temperature variation and the humidity absorption as compared with a glass lens, so that, in particular, a problem arises in the variation of focus due to the change of refractive index of the material. In order to suppress the problem, it is desirable to weaken a refractive power of the lens as much as possible. Therefore, in the zoom lens according to the second and third aspects of the invention, an aspheric surface is disposed on the most object side of the second lens subunit, which is a position near the stop where a central light beam is large, so that it becomes possible to correct spherical aberration well even if the refractive power of the aspherical lens is weakened.

In the present embodiments, in addition to the above-described basic concept, the second lens unit is composed of, in order from the object side, a plastic aspherical lens and a negative lens having a concave surface facing the object side a curvature of which is stronger than that of an opposite surface thereof. In order to shorten the total length of the entire lens system, a strong telephoto type is adopted for the purpose of strengthening a refractive power of each lens unit. If the refractive power of the second lens unit is strengthened, an off-axial light beam passes through at a position distant from the optical axis, particularly, at the wide-angle end, so that it becomes difficult to correct distortion and coma occurring in the wide-angle end.

Therefore, by disposing the plastic aspherical lens in the second lens unit, distortion and coma occurring, particularly, in the wide-angle end are corrected. Further, according to the second aspect of the invention, the above-mentioned conditions (9) to (13) are made to be satisfied.

Alternatively, the first lens unit is composed of, in order from the object side, a positive lens, a negative lens, a plastic aspherical lens and a positive lens. In this construction, the third lens is provided with an aspheric surface, thereby preventing the lowering of an optical performance caused by the refractive power strengthened for the purpose of the minimization of the lens system, so that a high optical performance is obtained.

The above construction essentially corresponds to a triplet lens, within which an aspherical lens having a weak refractive power is disposed. Further, a stop is disposed between the second lens and the third lens, thereby increasing the aberration correcting effect of the aspheric surface of the third lens.

In this instance, according to the fourth aspect of the invention, the above-mentioned conditions (9) to (14) are made to be satisfied.

Next, the technical significance of each of the above-mentioned conditions (9) to (14) is described. It is to be noted that, in the present embodiments, the terms "wide-angle end" and "telephoto end" mean zoom positions which are both ends of a maximum range within which the lens units are movable with the limitation by a mechanism.

The condition (9) is concerned with the ratio of the focal length of the first lens unit to the focal length of the entire lens system at the wide-angle end, and mainly aims at taking the balance between the minimization and the high optical performance.

When the lower limit of the condition (9) is exceeded with the refractive power of the first lens unit becoming too strong, in particular, spherical aberration occurring in the first lens unit is increased, tending to be under-corrected, so that it becomes difficult to correct the variation of spherical aberration due to the variation of magnification. Conversely, when the upper limit is exceeded with the refractive power of the first lens unit becoming too weak, the lens diameter of the first lens unit is caused to increase, so that it becomes impossible to attain the minimization of the zoom lens at which the second and third aspects of the invention aim.

In order to aim at taking the higher balance between the minimization and the high optical performance, it is preferred that the lower limit of the condition (9) is set to "0.55" and the upper limit thereof is set to "0.70".

The condition (10) is concerned with the ratio of the focal length of the second lens unit to the focal length of the entire lens system at the wide-angle end, and mainly aims at taking the balance between the minimization and the high optical performance.

When the lower limit of the condition (10) is exceeded with the refractive power of the second lens unit becoming too strong, in particular, distortion at the wide-angle end is increased, the Petzval sum increases in the negative direction, and the image plane characteristic is lowered disadvantageously. Conversely, when the upper limit is exceeded with the refractive power of the second lens unit becoming too weak, the lens diameter of the second lens unit is caused to increase, and the amount of movement of the second lens unit during the variation of magnification increases, so that the total length of the entire lens system at the telephoto end increases disadvantageously.

In order to aim at taking the higher balance between the minimization and the high optical performance, it is preferred that the lower limit of the condition (10) is set to "0.50" and the upper limit thereof is set to "0.65".

The condition (11) is provided for defining the refractive index of material of the aspherical lens of the second lens subunit of the first lens unit, and mainly aims at correcting the image plane characteristic well.

When the lower limit of the condition (11) is exceeded, the amount of asphericity of the aspherical lens is increased, so that it becomes difficult to form the aspherical lens. Conversely, when the upper limit is exceeded, it becomes difficult to set the shape of a lens surface for correcting spherical aberration well.

The condition (12) is concerned with the ratio of the focal length of the entire lens system at the wide-angle end to the focal length of the aspherical lens of the second lens subunit, and mainly aims at suppressing the variation of focus caused by the temperature change and the humidity change.

When the upper limit of the condition (12) is exceeded with the refractive power of the aspherical lens becoming too strong, the variation of focal length of the aspherical lens caused by the temperature change and the humidity change, in particular, the change of refractive index, is increased, so that the variation of focus of the entire lens system, in particular, in the telephoto end increases disadvantageously.

In order to further suppress the variation of focus caused by the temperature change and the humidity change, it is preferred that the upper limit of the condition (12) is set to "0.50".

The condition (13) is concerned with the ratio of the distance on the optical axis between the stop and the lens surface on the most image side of the first lens unit to the lens thickness of the first lens unit (the distance on the optical axis between the lens surface on the most object side of the first lens unit and the lens surface on the most image side thereof), and mainly aims at setting the pupil position to attain the small-sized and wide-angle zoom lens.

In order to attain the thinning of a camera, it is desirable to shorten the total length of the optical system in the telephoto end. To shorten the total length of the optical system in the telephoto end, it is advantageous to widen the focal length range to some degree. However, as one of problems arising in widening the focal length range, the amount of peripheral light must be ensured, so that it becomes important to decide where the stop is disposed.

When the lower limit of the condition (13) is exceeded with the stop disposed on the most image side of the first lens unit, the entrance pupil shifts relatively to the image side, and, thus, the diameter of the front lens element is increased. Therefore, if it is intended to ensure the amount of peripheral light when widening the focal length range, not only the lens diameter is increased but also it becomes difficult to correct, in particular, coma at the wide-angle end. Conversely, when the upper limit is exceeded, an off-axial light beam passing through the second lens unit is away from the optical axis, so that the variation of lateral chromatic aberration is increased disadvantageously.

In order to further attain both the minimization and the high optical performance, it is preferred that the lower limit of the condition (13) is set to "0.50" and the upper limit thereof is set to "0.65".

The condition (14) is concerned with the ratio of the air separation between the third lens and the fourth lens of the first lens unit to the lens thickness of the first lens unit, and mainly aims at correcting spherical aberration well.

When the lower limit of the condition (14) is exceeded, the third lens and the fourth lens of the first lens unit come too close to each other, so that there is the possibility that the third lens and the fourth lens interfere with each other due to the manufacturing error. Conversely, when the upper limit is exceeded, the third lens, which has an aspheric surface, is disposed away from the fourth lens, so that it becomes difficult to set the shape of the aspheric surface for correcting, in particular, spherical aberration well, and the lens diameter tends to increase disadvantageously.

In order to further correct spherical aberration well, it is preferred that the upper limit of the condition (14) is set to "0.05".

In order to further attaining the minimization and the high optical performance in the second and third aspects of the invention, it is preferred to satisfy at least one of the following conditions.

(B1) The following condition is satisfied:

$$0.80 < TD/Y < 1.20 \tag{15}$$

where TD is a distance between the first lens surface (the lens surface on the most object side of the entire lens system)

and the last lens surface (the lens surface on the most image side of the entire lens system) at the telephoto end, and Y is a maximum image height.

When the lower limit of the condition (15) is exceeded, the minimization going too far, a refractive power of each lens unit is strengthened too much, so that it becomes difficult to correct aberrations. Conversely, when the upper limit is exceeded, the thickness of a camera obtained when a lens barrel has been stowed in a camera body during the nonuse of the camera is increased disadvantageously.

In order to further attain the minimization, it is preferred that the upper limit of the condition (15) is set to "1.10".

(B2) The following conditions are satisfied:

$$|fw/f21|<0.40 \quad (16)$$

$$1.46<N21<1.62 \quad (17)$$

where f21 and N21 are respectively a focal length and a refractive index of material of the lens on the most object side of the second lens unit, and fw is a focal length of the entire lens system at the wide-angle end.

When the upper limit of the condition (16) is exceeded with the refractive power of the aspherical lens of the second lens unit becoming too strong, the variation of focal length of the aspherical lens due to the temperature change and the humidity change, in particular, the change of refractive index, is increased, and, in particular, the variation of focus of the entire lens system at the telephoto end is increased disadvantageously.

In order to further suppress the variation of focus, it is preferred that the upper limit of the condition (16) is set to "0.30".

When the lower limit of the condition (17) is exceeded, the amount of asphericity of the aspherical lens is increased, so that the aspherical lens comes to have the shape difficult to form, and, in particular, it becomes difficult to correct coma at the wide-angle end. Conversely, when the upper limit is exceeded, the Petzval sum in the second lens unit increases in the negative direction, and, in particular, the image plane characteristic at the wide-angle end is lowered disadvantageously.

(B3) The following conditions are satisfied:

$$1.75<N12<1.90 \quad (18)$$

$$25<v12<35 \quad (19)$$

where N12 and v12 are respectively a refractive index and an Abbe number of material of the negative lens disposed on the most object side of the first lens unit.

When the lower limit of the condition (18) is exceeded, the Petzval sum in the first lens unit increases in the negative direction, and, in particular, the image plane characteristic at the wide-angle end is lowered disadvantageously. Conversely, when the upper limit is exceeded, in particular, it becomes difficult to set the shape of the lens for correcting coma at the wide-angle end well.

(B4) The first lens unit is provided with at least an aspheric surface having a negative refractive power, in which the negative refractive power becomes stronger progressively from the optical axis to the margin.

If the positive refractive power of the first lens unit is strengthened for the purpose of the minimization, spherical aberration occurring in the first lens unit becomes undercorrected. Therefore, by adopting the aspheric surface in which the negative refractive power becomes stronger progressively from the optical axis to the margin, it becomes possible to correct spherical aberration well.

(B5) The second lens unit is provided with at least an aspheric surface in which a positive refractive power becomes stronger progressively from the optical axis to the margin.

If the negative refractive power of the second lens unit is strengthened for the purpose of the minimization, in particular, coma and curvature of field in the wide-angle end become bad. Therefore, by adopting the aspheric surface in which the positive refractive power becomes stronger progressively from the optical axis to the margin so as to cancel the negative refractive power of the second lens unit, it becomes possible to correct coma and curvature of field well.

(B6) Focusing is effected by moving the first lens unit only, or by moving both the first and second lens units while varying the interval between the first and second lens units.

Next, numerical data of the numerical examples 6 to 11 are shown.

Further, the values of the factors in the above-mentioned conditions (9) to (19) for the numerical examples 6 to 11 are listed in Table-2.

NUMERICAL EXAMPLE 6

| f = 25.0–50.0 | Fno = 4.30–8.60 | 2ω = 69.2–38.1 | |
|---|---|---|---|
| R1 = 10.396 | D1 = 1.20 | N1 = 1.581439 | v1 = 40.8 |
| R2 = 15.838 | D2 = 1.10 | | |
| R3 = −13.743 | D3 = 0.90 | N2 = 1.846660 | v2 = 23.8 |
| R4 = −27.528 | D4 = 0.85 | | |
| R5 = Stop | D5 = 1.35 | | |
| R6 = −35.154 | D6 = 1.20 | N3 = 1.583060 | v3 = 30.2 |
| *R7 = −42.516 | D7 = 0.30 | | |
| R8 = 20.297 | D8 = 2.70 | N4 = 1.516330 | v4 = 64.2 |
| R9 = −10.762 | D9 = Variable | | |
| *R10 = −29.736 | D10 = 1.80 | N5 = 1.583060 | v5 = 30.2 |
| R11 = −23.585 | D11 = 4.39 | | |
| R12 = −7.186 | D12 = 1.10 | N6 = 1.712995 | v6 = 53.9 |
| R13 = −29.269 | | | |

| Variable | Focal length | | |
|---|---|---|---|
| Separation | 25.0 | 32.3 | 50.0 |
| D9 | 5.32 | 3.14 | 0.50 |

*Aspheric Surface

Aspheric Coefficients:

| R7 | B = 2.52990e−04 | C = 2.11948e−06 | D = −1.31284e−07 |
|---|---|---|---|
| | E = 1.50528e−08 | | |
| R10 | B = 1.83723e−04 | C = −3.42587e−06 | D = 3.74070e−07 |
| | E = −1.05955e−08 | F = 1.15579e−10 | |

NUMERICAL EXAMPLE 7

| f = 25.0–50.0 | Fno = 4.30–8.60 | 2ω = 69.2–38.1 | |
|---|---|---|---|
| R1 = 10.754 | D1 = 1.25 | N1 = 1.603420 | v1 = 38.0 |
| R2 = 16.682 | D2 = 1.17 | | |
| R3 = −14.364 | D3 = 0.85 | N2 = 1.846660 | v2 = 23.8 |
| R4 = −39.502 | D4 = 0.85 | | |
| R5 = Stop | D5 = 1.35 | | |
| R6 = −36.347 | D6 = 1.25 | N3 = 1.583060 | v3 = 30.2 |
| *R7 = −43.537 | D7 = 0.30 | | |

-continued

| | | | |
|---|---|---|---|
| R8 = 18.465 | D8 = 2.60 | N4 = 1.522494 | ν4 = 59.8 |
| R9 = −10.595 | D9 = Variable | | |
| *R10 = −26.582 | D10 = 1.85 | N5 = 1.583060 | ν5 = 30.2 |
| R11 = −20.283 | D11 = 4.37 | | |
| R12 = −7.442 | D12 = 1.05 | N6 = 1.772499 | ν6 = 49.6 |
| R13 = −29.355 | | | |

| Variable | Focal length | | |
|---|---|---|---|
| Separation | 25.0 | 32.3 | 50.0 |
| D9 | 5.54 | 3.36 | 0.74 |

*Aspheric Surface

Aspheric Coefficients:

| | | | | |
|---|---|---|---|---|
| R7 | B = 2.63873e−04 | C = 4.48995e−06 | D = −1.29629e−07 | |
| | E = 4.62027e−09 | | | |
| R10 | B = 1.66391e−04 | C = −3.22654e−06 | D = 3.50878e−07 | |
| | E = −1.05961e−08 | F = 1.20214e−10 | | |

NUMERICAL EXAMPLE 8 f = 24.0–48.0  Fno = 4.30–8.59  2ω = 71.4–39.6

| | | | |
|---|---|---|---|
| R1 = 10.307 | D1 = 1.25 | N1 = 1.603420 | ν1 = 38.0 |
| R2 = 15.576 | D2 = 1.10 | | |
| R3 = −13.492 | D3 = 0.80 | N2 = 1.846660 | ν2 = 23.8 |
| R4 = −28.985 | D4 = 0.85 | | |
| R5 = Stop | D5 = 1.30 | | |
| R6 = −40.342 | D6 = 1.30 | N3 = 1.583060 | ν3 = 30.2 |
| *R7 = −48.693 | D7 = 0.20 | | |
| R8 = 19.747 | D8 = 2.50 | N4 = 1.516330 | ν4 = 64.2 |
| R9 = −10.539 | D9 = Variable | | |
| *R10 = −29.118 | D10 = 1.90 | N5 = 1.583060 | ν5 = 30.2 |
| R11 = −23.584 | D11 = 4.52 | | |
| R12 = −7.278 | D12 = 1.10 | N6 = 1.712995 | ν6 = 53.9 |
| R13 = −29.059 | | | |

| Variable | Focal length | | |
|---|---|---|---|
| Separation | 24.0 | 31.13 | 48.0 |
| D9 | 5.40 | 3.08 | 0.34 |

*Aspheric Surface

Aspheric Coefficients:

| | | | |
|---|---|---|---|
| R7 | B = 2.573050e−04 | C = 4.58244e−06 | D = −1.08442e−07 |
| | E = 5.15567e−09 | | |
| R10 | B = 1.83292e−04 | C = −3.38731e−06 | D = 3.70586e−07 |
| | E = −1.05634e−08 | F = 1.13743e−10 | |

NUMERICAL EXAMPLE 9 f = 24.0–48.0  Fno = 4.30–8.60  2ω = 71.4–39.5

| | | | |
|---|---|---|---|
| R1 = 10.384 | D1 = 1.20 | N1 = 1.575006 | ν1 = 41.5 |
| R2 = 15.386 | D2 = 1.24 | | |
| R3 = −14.506 | D3 = 0.85 | N2 = 1.846660 | ν2 = 23.8 |
| R4 = −26.273 | D4 = 0.90 | | |
| R5 = Stop | D5 = 1.15 | | |
| *R6 = −31.831 | D6 = 1.40 | N3 = 1.583060 | ν3 = 30.2 |
| *R7 = −143.217 | D7 = 0.30 | | |

-continued

| | | | |
|---|---|---|---|
| R8 = 19.615 | D8 = 2.70 | N4 = 1.518229 | ν4 = 59.0 |
| R9 = −9.264 | D9 = Variable | | |
| *R10 = −29.226 | D10 = 1.85 | N5 = 1.583060 | ν5 = 30.2 |
| R11 = −25.614 | D11 = 4.45 | | |
| R12 = −7.301 | D12 = 1.10 | N6 = 1.712995 | ν6 = 53.9 |
| R13 = −28.164 | | | |

| Variable | Focal length | | |
|---|---|---|---|
| Separation | 24.0 | 31.1 | 48.0 |
| D9 | 5.60 | 3.35 | 0.69 |

*Aspheric Surface

Aspheric Coefficients:

| | | | |
|---|---|---|---|
| R6 | B = −1.35466e−04 | C = −5.33741e−06 | D = 4.15846e−08 |
| | E = −1.40359e−08 | | |
| R7 | B = 2.25815e−04 | C = 8.39612e−07 | D = 2.01894e−08 |
| | E = −1.00922e−08 | | |
| R10 | B = 1.84318e−04 | C = −3.55273e−06 | D = 3.60674e−07 |
| | E = −1.01797e−08 | F = 1.11433e−10 | |

NUMERICAL EXAMPLE 10 f = 24.0–50.0  Fno = 4.30–8.95  2ω = 71.4–38.1

| | | | |
|---|---|---|---|
| R1 = 10.457 | D1 = 1.20 | N1 = 1.575006 | ν1 = 41.5 |
| R2 = 13.981 | D2 = 1.32 | | |
| R3 = −14.160 | D3 = 0.90 | N2 = 1.846660 | ν2 = 23.8 |
| R4 = −22.659 | D4 = 0.90 | | |
| R5 = Stop | D5 = 1.15 | | |
| *R6 = −30.169 | D6 = 1.30 | N3 = 1.583060 | ν3 = 30.2 |
| R7 = −595.838 | D7 = 0.30 | | |
| R8 = 20.992 | D8 = 2.65 | N4 = 1.518229 | ν4 = 59.0 |
| R9 = −8.523 | D9 = Variable | | |
| *R10 = −30.235 | D10 = 1.85 | N5 = 1.583060 | ν5 = 30.2 |
| *R11 = −26.326 | D11 = 4.43 | | |
| R12 = −7.275 | D12 = 1.10 | N6 = 1.712995 | ν6 = 53.9 |
| R13 = −26.913 | | | |

| Variable | Focal length | | |
|---|---|---|---|
| Separation | 24.0 | 31.7 | 50.0 |
| D9 | 5.89 | 3.47 | 0.71 |

*Aspheric Surface

Aspheric Coefficients:

| | | | |
|---|---|---|---|
| R6 | B = −4.48262e−04 | C = −9.59126e−06 | D = 8.02970e−08 |
| | E = −9.62809e−09 | | |
| R10 | B = 1.80532e−04 | C = −1.82433e−06 | D = 3.37083e−07 |
| | E = −1.01739e−08 | F = 1.10595e−10 | |
| R11 | B = 4.20455e−06 | C = 7.38218e−07 | D = 5.30286e−09 |
| | E = 6.49093e−11 | F = −4.31070e−12 | |

NUMERICAL EXAMPLE 11 f = 24.0–51.0  Fno = 4.30–9.14  2ω = 71.4–37.4

| | | | |
|---|---|---|---|
| R1 = 10.219 | D1 = 1.20 | N1 = 1.581439 | ν1 = 40.8 |
| R2 = 13.571 | D2 = 1.27 | | |
| R3 = −14.868 | D3 = 0.90 | N2 = 1.846660 | ν2 = 23.8 |
| R4 = −40.303 | D4 = 0.90 | | |
| R5 = Stop | D5 = 1.15 | | |

-continued

| | | | |
|---|---|---|---|
| *R6 = −60.171 | D6 = 1.30 | N3 = 1.524700 | ν3 = 56.2 |
| R7 = −170.146 | D7 = 0.30 | | |
| R8 = 20.055 | D8 = 2.65 | N4 = 1.522494 | ν4 = 59.8 |
| R9 = −9.170 | D9 = Variable | | |
| *R10 = −36.514 | D10 = 1.85 | N5 = 1.524700 | ν5 = 56.2 |
| *R11 = −34.220 | D11 = 4.95 | | |
| R12 = −7.533 | D12 = 1.10 | N6 = 1.712995 | ν6 = 53.9 |
| R13 = −27.829 | | | |

| Variable | Focal length | | |
|---|---|---|---|
| Separation | 24.0 | 32.1 | 51.0 |
| D9 | 6.11 | 3.57 | 0.75 |

*Aspheric Surface

Aspheric Coefficients:

| | | | |
|---|---|---|---|
| R6 | B = −4.38512e−04 | C = −6.90752e−06 | D = 1.17444e−08 |
| | E = −8.86181e−09 | | |
| R10 | B = 1.52858e−04 | C = 6.30021e−07 | D = 2.69504e−07 |
| | E = −1.03726e−08 | F = 1.19202e−10 | |
| R11 | B = −9.30986e−06 | C = 2.89676e−06 | D = −6.32871e−09 |
| | E = −9.44449e−10 | F = 7.62569e−12 | |

TABLE 2

| | Numerical Example | | | | | |
|---|---|---|---|---|---|---|
| Condition | 6 | 7 | 8 | 9 | 10 | 11 |
| (9) f1/fw | 0.65 | 0.65 | 0.68 | 0.67 | 0.67 | 0.68 |
| (10) \|f2\|/fw | 0.59 | 0.59 | 0.62 | 0.61 | 0.62 | 0.62 |
| (11) N13 | 1.583 | 1.583 | 1.583 | 1.583 | 1.583 | 1.525 |
| (12) \|fw/f13\| | 0.067 | 0.062 | 0.056 | 0.34 | 0.44 | 0.13 |
| (13) Lp/D1 | 0.58 | 0.57 | 0.57 | 0.57 | 0.56 | 0.56 |
| (14) d34/D1 | 0.031 | 0.031 | 0.022 | 0.031 | 0.031 | 0.031 |
| (15) TD/Y | 1.01 | 1.02 | 0.99 | 1.03 | 1.03 | 1.06 |
| (16) \|fw/f21\| | 0.14 | 0.19 | 0.13 | 0.08 | 0.08 | 0.03 |
| (17) N21 | 1.583 | 1.583 | 1.583 | 1.583 | 1.583 | 1.525 |
| (18) N12 | 1.847 | 1.847 | 1.847 | 1.847 | 1.847 | 1.847 |
| (19) ν12 | 23.8 | 23.8 | 23.8 | 23.8 | 23.8 | 23.8 |

As described above, according to the embodiments corresponding to the second and third aspects of the invention, in the two-unit zoom lens, the refractive power of each lens unit is appropriately set, and the construction of the first lens unit is appropriately set. In particular, a stop is disposed within the first lens unit, and the refractive power and the refractive index of material of the aspherical lens of the first lens unit are appropriately set. Accordingly, it is possible to attain a small-sized zoom lens which has a high optical performance and a relatively simple construction while minimizing, in particular, thinning, the entire lens system.

Next, an embodiment of a photographing apparatus which serves as an optical apparatus having a zoom lens according to any one of the numerical examples 1 to 11 is described with reference to FIGS. 23A and 23B.

Figure 23B:
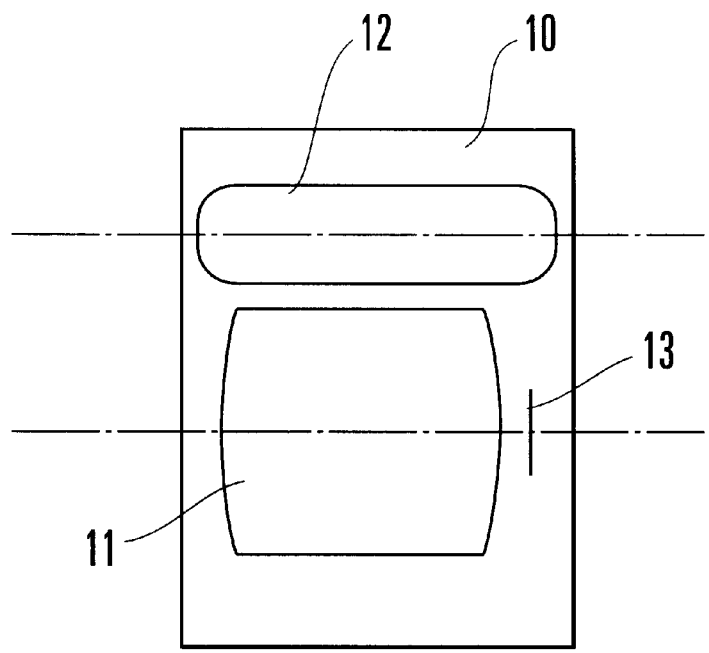

FIG. 23A is front view of the photographing apparatus, and FIG. 23B is a side sectional view thereof. In FIGS. 23A and 23B, there are illustrated a photographing apparatus body (casing) 10, a photographing optical system 11 using a zoom lens according to any one of the numerical examples 1 to 11, a viewfinder optical system 12, and a film 13 serving as a photosensitive surface.

As described above, it is possible to realize a compact and high-performance photographing apparatus by applying the zoom lens according to any one of the numerical examples 1 to 11 to a photographing optical system of the photographing apparatus.

What is claimed is:

1. A zoom lens comprising, in order from an object side to an image side:

a first lens unit of positive refractive power, said first lens unit comprising, in order from the object side to the image side, a first lens of positive refractive power having a convex surface facing the object side, a second lens of negative refractive power, a third lens of positive refractive power of meniscus form having a convex surface facing the image side and having an aspheric surface, and a fourth lens of positive refractive power; and a second lens unit of negative refractive power, wherein a variation of magnification is effected by varying an interval between said first lens unit and said second lens unit, and the following conditions are satisfied:

$0.40 < f1/fw < 0.80$ $0.40 < |f2|/fw < 0.90$ where fw is a focal length of said zoom lens at a wide-angle end, f1 is a focal length of said first lens unit, and f2 is a focal length of said second lens unit; and wherein the following conditions are satisfied:

$0.30 < fG4/fw < 0.80$ $0.02 < DG4/ft < 0.09$ where fG4 is a focal length of said fourth lens of said first lens unit, DG4 is a lens thickness of said fourth lens of said first lens unit, and ft is a focal length of said zoom lens at a telephoto end.

2. A zoom lens according to claim 1, wherein said second lens unit comprises, in order from the object side to the image side, a first lens of positive refractive power having an aspheric surface, and a second lens of negative refractive power.

3. A zoom lens, comprising, in order from an object side to an image side:

a first lens unit of positive refractive power, said first lens unit comprising, in order from the object side to the image side, a first lens of positive refractive power having a convex surface facing the object side, a second lens of negative refractive power, a third lens of positive refractive power of meniscus form having a convex surface facing the image side and having an aspheric surface, and a fourth lens of positive refractive power; and a second lens unit of negative refractive power, wherein a variation of magnification is effected by varying an interval between said first lens unit and said second lens unit, and the following conditions are satisfied:

$0.40 < f1/fw < 0.80$ $0.40 < |f2|/fw < 0.90$ where fw is a focal length of said zoom lens at a wide-angle end, f1 is a focal length of said first lens unit, and f2 is a focal length of said second lens unit, wherein the following additional conditions are satisfied:

$0.01 < ft/fG3 < 2.30$ $nG3 > 1.630$ where fG3 is a focal length of said third lens of said first lens unit, nG3 is a refractive index of material of said third lens of said first lens unit, and ft is a focal length of said zoom lens at a telephoto end.

4. A zoom lens comprising, in order from an object side to an image side:

a first lens unit of positive refractive power, said first lens unit comprising, in order from the object side to the image side, a first lens of positive refractive power having a convex surface facing the object side, a second lens of negative refractive power, a third lens of positive refractive power of meniscus form having a convex surface facing the image side and having an aspheric surface, and a fourth lens of positive refractive power; and a second lens unit of negative refractive power, wherein a variation of magnification is effected by varying an interval between said first lens unit and said second lens unit, and the following conditions are satisfied:

$0.40 < f1/fw < 0.80$ $0.40 < |f2|/fw < 0.90$ where fw is a focal length of said zoom lens at a wide-angle end, f1 is a focal length of said first lens unit, and f2 is a focal length of said second lens unit, wherein the following additional condition is satisfied:

$0.02 < (r3+r4)/(r4-r3) < 0.60$ where r3 is a radius of curvature of a lens surface on the object side of said second lens of said first lens unit, and r4 is a radius of curvature of a lens surface on the image side of said second lens of said first lens unit.

5. A zoom lens according to claim 1, wherein the following condition is satisfied:

$0.50 < fG1/fw < 3.00$ where fG1 is a focal length of said first lens of said first lens unit.

6. A zoom lens comprising, in order from an object side to an image side:

a first lens unit of positive refractive power, said first lens unit consisting of, in order from the object side to the image side, a first lens subunit, a stop, and a second lens subunit of positive refractive power having an aspherical lens; and a second lens unit of negative refractive power, wherein a variation of magnification is effected by varying an interval between said first lens unit and said second lens unit, and the following conditions are satisfied:

$0.40 < f1/fw < 0.80$ $0.40 < |f2|/fw < 0.70$ $1.46 < N13 < 1.62$ $|fw/f13| < 0.60$ $0.40 < Lp/D1 < 0.70$ where f1 and f2 are focal lengths of said first lens unit and said second lens unit, respectively, fw is a focal length of said zoom lens at a wide-angle end, N13 is a refractive index of material of said aspherical lens included in said second lens subunit, f13 is a focal length of said aspherical lens, D1 is a total length of said first lens unit, and Lp is a distance between said stop and a lens surface disposed on the most image side of said first lens unit.

7. A zoom lens according to claim 6, wherein said second lens unit consists of, in order from the object side to the image side, an aspherical lens made of plastic material, and a negative lens having a concave surface facing the object side.

8. A zoom lens according to claim 6, wherein the following condition is satisfied:

$0.80 < TD/Y < 1.20$ where TD is a distance between a lens surface on the most object side of said zoom lens and a lens surface on the most image side of said zoom lens at a telephoto end, and Y is a maximum image height.

9. A zoom lens according to claim 6, wherein the following conditions are satisfied:

$|fw/f21| < 0.40$ $1.46 < N21 < 1.62$ where f21 and N21 are respectively a focal length and a refractive index of material of a lens on the most object side of said second lens unit.

10. A zoom lens according to claim 6, wherein the following conditions are satisfied:

$1.75 < N12 < 1.90$ $25 < v12 < 35$ where N12 and v12 are respectively a refractive index and an Abbe number of material of a negative lens disposed on the most object side of said first lens unit.

11. A zoom lens according to claim 6, wherein said first lens unit includes an aspherical lens having a negative refractive power and having an aspheric surface in which the negative refractive power becomes stronger progressively from an optical axis to a margin.

12. A zoom lens according to claim 6, wherein said second lens unit includes an aspherical lens having an aspheric surface in which a positive refractive power becomes stronger progressively from an optical axis to a margin.

13. A zoom lens comprising, in order from an object side to an image side:

a first lens unit of positive refractive power, said first lens unit consisting of, in order from the object side to the image side, a first lens subunit consisting of a first lens of positive refractive power and a second lens of negative refractive power, a stop, and a second lens subunit consisting of a third lens made of plastic material and having an aspheric surface and a fourth lens of positive refractive power; and a second lens unit of negative refractive power, wherein a variation of magnification is effected by varying an interval between said first lens unit and said second lens unit, and the following conditions are satisfied:

$0.40 < f1/fw < 0.80$ $0.40 < |f2|/fw < 0.70$ $1.46 < N13 < 1.62$ $|fw/f13| < 0.60$ $0.40 < Lp/D1 < 0.70$ $0.01 < d34/D1 < 0.10$ where f1 and f2 are focal lengths of said first lens unit and said second lens unit, respectively, fw is a focal length of said zoom lens at a wide-angle end, N13 is a refractive index of material of said third lens, f13 is a focal length of said third lens, D1 is a total length of said first lens unit, Lp is a distance between said stop and a lens surface disposed on the most image side of said first lens unit, and d34 is an air separation between said third lens and said fourth lens.

14. A zoom lens according to claim 13, wherein the following condition is satisfied:

$$0.80 < TD/Y < 1.20$$

where TD is a distance between a lens surface on the most object side of said zoom lens and a lens surface on the most image side of said zoom lens at a telephoto end, and Y is a maximum image height.

15. A zoom lens according to claim 13, wherein the following conditions are satisfied:

$$|fw/f21| < 0.40$$

$$1.46 < N21 < 1.62$$

where f21 and N21 are respectively a focal length and a refractive index of material of a lens on the most object side of said second lens unit.

16. A zoom lens according to claim 13, wherein the following conditions are satisfied:

$$1.75 < N12 < 1.90$$

$$25 < v12 < 35$$

where N12 and v12 are respectively a refractive index and an Abbe number of material of said second lens.

17. A zoom lens according to claim 13, wherein said third lens has a negative refractive power and has an aspheric surface in which the negative refractive power becomes stronger progressively from an optical axis to a margin.

18. A zoom lens according to claim 13, wherein said second lens unit includes an aspherical lens having an aspheric surface in which a positive refractive power becomes stronger progressively from an optical axis to a margin.

19. An optical apparatus comprising a zoom lens according to any one of claims 1 to 18.

* * * * *

UNITED STATES PATENT AND TRADEMARK OFFICE
CERTIFICATE OF CORRECTION

PATENT NO.    : 6,384,986 B1
DATED         : May 7, 2002
INVENTOR(S)   : Takeshi Nishimura It is certified that error appears in the above-identified patent and that said Letters Patent is hereby corrected as shown below:

Column 2,
Line 12, right margin should be closed up.
Line 13, left margin should be closed up.

Column 5,
Line 26, left margin should be closed up.

Column 8,
Line 60, "surface," should read -- unit, --.

Column 11,
Line 21, "B=1.41983e-04" should read -- B=1.41988e-04 --.

Column 13,
Line 26, "16A4, 16C1" should read -- 16A4, 16B1 to 16B4 and 16C1 --.

Column 16,
Line 59, "attaining" should read -- attain --.

Signed and Sealed this

Twenty-second Day of October, 2002

Attest:

Attesting Officer

JAMES E. ROGAN
Director of the United States Patent and Trademark Office